(12) United States Patent
Iida et al.

(10) Patent No.: US 8,388,232 B2
(45) Date of Patent: Mar. 5, 2013

(54) ROLLING BEARING

(75) Inventors: Akira Iida, Fujisawa (JP); Ryuya Fukuda, Fujisawa (JP)

(73) Assignee: NSK Ltd., Tokyo (JP)

( * ) Notice: Subject to any disclaimer, the term of this patent is extended or adjusted under 35 U.S.C. 154(b) by 537 days.

(21) Appl. No.: 12/522,859

(22) PCT Filed: Jan. 10, 2008

(86) PCT No.: PCT/JP2008/050216
§ 371 (c)(1),
(2), (4) Date: Jul. 10, 2009

(87) PCT Pub. No.: WO2008/084835
PCT Pub. Date: Jul. 17, 2008

(65) Prior Publication Data
US 2010/0014794 A1  Jan. 21, 2010

(30) Foreign Application Priority Data

| Jan. 11, 2007 | (JP) | 2007-003591 |
| Jan. 11, 2007 | (JP) | 2007-003592 |
| Jun. 21, 2007 | (JP) | 2007-164300 |
| Sep. 11, 2007 | (JP) | 2007-235496 |

(51) Int. Cl.
F16C 27/00 (2006.01)
F16C 27/04 (2006.01)
F16J 15/32 (2006.01)
F16J 15/02 (2006.01)

(52) U.S. Cl. ......... 384/535; 384/581; 277/574; 277/641

(58) Field of Classification Search ................. 384/535, 384/536, 581, 582; 277/573, 574, 641, 910
See application file for complete search history.

(56) References Cited

U.S. PATENT DOCUMENTS 3,940,152 A * 2/1976 Fournier ................. 277/641
(Continued)

FOREIGN PATENT DOCUMENTS

| JP | 1-109656 | 7/1989 |
| JP | 3-6126 | 1/1991 |

(Continued)

OTHER PUBLICATIONS

Michiie and Isihara; "Creep of Rolling bearing and its Measure." Kikai no Kenkyu, vol. 22, No. 8(1970). pp. 1133-1138.

*Primary Examiner* — Richard W Ridley
*Assistant Examiner* — Adam D Rogers
(74) *Attorney, Agent, or Firm* — Sughrue Mion, PLLC

(57) ABSTRACT

There is provided a rolling bearing which comprises at least: an outer ring 10 and an inner ring 20 disposed rotatable relative to each other; and plurality of rolling elements 40 respectively interposed rollably between the outer and inner rings. The outer ring is fitted into a housing (not shown) and the inner ring is fitted with a shaft (not shown), whereby the rolling bearing supports rotation between the shaft and housing. Between the fitting surface (not shown) of the housing and the outer circumferential surface 13 of the outer ring and/or between the fitting surface of the shaft and the inner circumferential surface 23 of the inner ring, there is interposed an O-ring 30 made of an elastic member having a reduced friction coefficient between the fitting surface of the housing and the outer circumferential surface of the outer ring or between the fitting surface of the shaft and the inner circumferential surface of the inner ring.

7 Claims, 21 Drawing Sheets

U.S. PATENT DOCUMENTS

| | | | |
|---|---|---|---|
| 4,696,587 A * | 9/1987 | Nishida et al. | 384/536 |
| 6,783,322 B2 * | 8/2004 | Ray et al. | 415/112 |
| 2011/0232245 A1 * | 9/2011 | Protasiewicz et al. | 55/502 |

FOREIGN PATENT DOCUMENTS

| | | |
|---|---|---|
| JP | 8-74845 A | 3/1996 |
| JP | 2000-87988 A | 3/2000 |
| JP | 2000-120669 A | 4/2000 |
| JP | 2002-130309 A | 5/2002 |
| JP | 2004-11846 A | 1/2004 |
| JP | 2004-108463 A | 4/2004 |
| JP | 2004-176785 A | 6/2004 |
| JP | 2004-308839 A | 11/2004 |
| JP | 2005-321006 A | 11/2005 |
| JP | 2006-161876 A | 6/2006 |
| JP | 2006-226485 A | 8/2006 |
| JP | 2007-247695 A | 9/2007 |

* cited by examiner

ROLLING BEARING

TECHNICAL FIELD

The present invention relates to a rolling bearing for use in a fan motor or the like in which the bearing is fitted with a motor housing of the fan motor to thereby support rotation between a shaft of the fan motor and the motor housing.

Further, the invention also relates to a rolling bearing to which imbalanced rotation load is applied, such as a general-purpose motor, a fan motor, a gear motor, a servo motor, a power tool and the like.

BACKGROUND ART

First Background Art

For example, a rolling bearing for use in a fan motor or the like is shown in FIG. 6 which is a section view of the rolling bearing in a radial direction thereof. An inner ring 20 and an outer ring 10 so disposed as to cover the outer periphery of the inner ring 20 are so as to be rotated relative to each other. The inner ring 20 includes an inner ring raceway 21 formed on the outer diameter surface so as to extend continuously in the circumferential direction of the outer circumferential surface thereof. The outer ring 10 includes an outer ring raceway 11 formed on the inner circumferential surface so as to extend continuously in the circumferential direction of the inner circumferential surface. A plurality of rolling elements 40 are interposed between the inner ring raceway 21 and the outer ring raceway 11 while being held by a cage 41 with a regular interval.

Further, between the outer ring 10 and inner ring 20, there are incorporated seal members 42 which are used to seal the internal portion of the bearing on the side surfaces of the bearing. As the seal member 42, in FIG. 6, there is illustrated a seal member having a shield structure; however, instead of this, there can also be provided a contact seal or a non-contact seal according to the structures or kinds of rolling bearings to be used. Here, as the rolling element 40, in FIG. 6, there is illustrated a ball; however, there can also be applied a roller according to the structure or kind of a rolling bearing to be used.

The outer ring 10 of the rolling bearing is fitted with and fixed to a housing (a motor housing which is not shown) for storing the fan motor therein, and the inner ring 20 is fitted with and fixed to the rotation shaft (not shown) of the fan motor, whereby the portion between the rotation shaft and the motor housing is rotatably supported by the rolling bearing.

However, there is known a phenomenon, that is, the occurrence of a so called creep that, on the surface where the outer ring 10 of the rolling bearing and the motor housing are fitted with each other, the fitted and fixed outer ring 10 is rotated relatively to the rotation direction of the inner ring 20. When this creep occurs, there is a possibility that the fitted surface can be worn down and the function of the rolling bearing can be thereby impaired. Therefore, in order to prevent the occurrence of such creep, conventionally, there are known several methods. For example, known are a method for connecting together the outer ring of the rolling bearing and the motor housing a key or a pin, or for fixing together the outer ring and the motor housing adhesive to thereby prevent the occurrence of the creep an external force; a method for reducing a clearance between the motor housing; and, a method for using an elastic member to thereby prevent the movement of the creep.

In the example shown in FIG. 6, into recessed grooves (circumferential grooves) which are respectively formed in the outer circumferential surface 13 of the outer ring 10, there are fitted elastic members (for example, rubber-made O-rings 30 each having a given level of hardness), whereby the outer ring is fixed to the motor housing by the elastic forces of these elastic members.

Specifically, in the outer circumferential surface 13 of the outer ring 10, there are formed multiple recessed grooves (circumferential grooves) 12 which respectively extend continuously in the circumferential direction of the outer circumferential surface 13 and also each have a rectangular-shaped section in the radial direction thereof. For example, in FIG. 6, there are arranged two recessed grooves 12 spaced from each other in the axial direction of the bearing. Further, into each recessed groove 12, there is fitted the O-ring 30. Here, the outer diameter dimension of the O-ring 30 is set larger than the outer diameter dimension of the outer ring 10; and, when the O-ring 30 is fitted into the recessed groove 12 of the outer ring 10, the outer diameter side of the O-ring 30 is allowed to project from the outer circumferential surface 13 of the outer ring 10 (see the patent reference 1 and 2).

Owing to this, the outside diameter of the O-ring 30 is interposed between the fitted surface of the motor housing and the outer ring 10 to press against them owing to the elastic force of the rubber, whereby a friction force overcoming the relative rotation torque of the creep is generated between the fitted surface of the O-ring 30 and the motor housing to thereby prevent the occurrence of the creep.

According to the above method, there can be expected an effect to reduce a clearance between the motor housing and the outer ring 10 due to the thickness of the O-ring 30 and also an effect that, while the O-ring 30 is closely contacted with the outer ring 10 owing to the pressing force of the O-ring 30, there is generated a friction force between the outer ring 10 and the motor housing owing to the elastic force of the rubber to thereby prevent the relative rotation movement of the outer ring 10 due to the creep.

However, conventionally, by increasing the friction force between the outer ring 10 of the bearing and the motor housing, the outer ring 10 is firmly fixed to the motor housing to thereby prevent the occurrence of the creep. But, there has been raised a case in which stress to generate a creep can exceed the friction force or the friction force can be lowered temporarily, thereby generating a creep. And, when the creep is generated once, the relative rotation of the outer ring 10 causes an extremely large torque (a creep torque), and the thus caused creep torque acts between the outer ring and the motor housing, thereby impaling the function of the rolling bearing.

Second Background Art

In order to prevent the occurrence of a creep, there is generally known a method in which there is formed a ring-shaped recessed groove along the circumferential direction of the outer circumferential surface of the outer ring, an elastic member such as a rubber member is inserted into the circumferential direction recessed groove, and the elastic member presses against and between the housing and the outer ring, thereby preventing the occurrence of the creeping.

According to the patent reference 1, there is disclosed a rolling bearing including a recessed groove formed in the outer circumferential surface of an outer ring and an O-ring fitted into the recessed groove and projecting from the recessed groove, wherein the hardness of the O-ring is set in the range of Hs 60~75 and the amount of projection of the O-ring from the recessed groove is set in the range of 4~40% of the diameter of the O-ring.

However, in order to enhance the insertion performance of the rolling bearing into the housing, it is necessary to decrease the projection amount of the O-ring with respect to the outer circumferential surface of the outer ring. On the other hand, in order to enhance the creep preventive performance, it is necessary to increase the projection amount of the O-ring. However, it is difficult to realize these conflicting things at the same time.

Third Background Art

For example, in a rolling bearing used in a fan motor or the like, as shown in FIG. 11, raceway rings (an outer ring 2010 and an inner ring 2020) are disposed opposed to each other so as to be rotated relative to each other; in the inner circumferential surface of the outer ring 2010, there is formed an outer ring raceway 2011 so as to continue in the circumferential direction of the inner circumferential surface; in the outer circumferential surface of the inner ring 2020, there is formed an inner ring raceway 2021 so as to continue in the circumferential direction of the outer circumferential surface; and, between the inner ring raceway 2021 and the outer ring raceway 2011, there are rollably incorporated plurality of rolling elements 2040 while they are supported at regular intervals by cages 2041.

Further, between the outer ring 2010 and inner ring 2020, there are incorporated seal members 2042 which are used to seal the interior portion of the rolling bearing from the outside of the rolling bearing. As the seal member 2042, in FIG. 11, there is illustrated a seal member having a shield structure. However, there may also be incorporated a contact seal or a non-contact seal depending on the structures and kinds of rolling bearings. Here, as the rolling element 2040, in FIG. 11, there is illustrated a ball; however, there may also be used a roller according to the structures and kinds of rolling bearings.

The outer ring 2010 of the rolling bearing is fitted into and fixed to a housing (a motor housing which is not shown) serving as a fixing portion for accommodating and fixing a fan motor, and the inner ring 2020 is fitted with and fixed to a rotation shaft (not shown) serving as the rotation portion of the fan motor, whereby the shaft is rotatably supported by the rolling bearing.

Here, there is known a phenomenon, that is, the occurrence of a creep that, in a surface where the outer ring 2010 of a rolling bearing and the motor housing are fitted with each other, the fitted and fixed outer ring 2010 is rotated in the opposite direction relative to the rotation direction of the inner ring 2020. When such creep occurs, there is raised a fear that the fitting surface can be worn and the worn powder can enter the inside of the rolling bearing.

In view of the above, in order to prevent the occurrence of such creep, in an example shown in FIG. 11, an elastic member (for example, an O-ring 2030 made of rubber having a given hardness) is fitted into a recessed groove formed in the outer circumferential surface 2013 of the outer ring 2010 (a groove which is formed continuously in the circumferential direction of the outer circumferential surface 2013), thereby fixing the outer ring 2010 to the motor housing.

Specifically, in the outer circumferential surface 2013 of the outer ring 2010, there are formed multiple recessed grooves 2012, which respectively extend continuously in the circumferential direction of the outer circumferential surface 2013 and each have a rectangular-shaped section in the radial direction thereof so as to be spaced from each other in the axial direction of the surface 2013. For example, in FIG. 11, there are arranged two recessed grooves 2012 so as to be spaced from each other in the axial direction. Further, into these recessed grooves 2012, there are fitted O-rings 2030 respectively. Here, the outer diameter dimension of the O-ring 2030 is set larger than the outer diameter dimension of the outer ring 2010 and, when the O-ring 2030 is fitted into the recessed groove 2012 of the outer ring 2010, the outer diameter side of the O-ring 2030 projects from the outer circumferential surface 2013 of the outer ring 2010 (see the patent reference 1).

Thus, the outer diameter side of the O-ring 2030 is interposed between the fitting surface of the motor housing and the outer ring 2010 to press against them owing to the elastic force of the rubber and thus generate, between the O-ring 2030 and the fitting surface of the motor housing, a friction force overcoming the relative rotation torque of the creep, thereby preventing the occurrence of a creep.

According to this method, while the O-ring 2030 is in close contact with the outer ring 2010 owing to the pressing force of the O-ring 2030, there is generated a friction force between the outer ring 2010 and the motor housing owing to the elastic force of the rubber to firmly fix the outer ring 2010 to the motor housing, thereby being able to provide a creep preventing effect.

However, according to this method, there is a possibility that there can be generated a creep between the recessed groove 2012 of the outer ring 2010 and O-ring 2030 as well. When such creep occurs, the original creep-resisting property of the bearing can be degraded, resulting in the early occurrence of a creep phenomenon.

Fourth Background Art

As an example of a bearing, in FIG. 16, there is illustrated a rolling bearing in which: an inner ring 3020 and an outer ring 3010 so disposed as to cover the outer periphery of the inner ring 3020 are disposed so as to be rotated relative to each other; the inner ring 3020 includes an inner ring raceway 3021 formed on the outer diameter surface so as to extend continuously in the circumferential direction of the outer diameter surface; the outer ring 3010 includes an outer ring raceway 3011 formed on the inner circumferential surface so as to extend continuously in the circumferential direction of the inner circumferential surface; and, between the inner ring raceway 3021 and the outer ring raceway 3011, there are rollably incorporated plurality of rolling elements 3040 while being held at regular intervals by cages 3041.

Further, between the outer ring 3010 and inner ring 3020, there are incorporated seal members 3042 which are used to seal the internal portion of the rolling bearing from the outside of the rolling bearing. As the seal member 42, in FIG. 16, there is illustrated a seal member having a shield structure; however, there can also be provided a contact seal or a non-contact seal depending on the structures or kinds of rolling bearings. Here, as the rolling element 3040, in FIG. 16, there is illustrated a ball; however, there can also be applied a roller depending on the structures or kinds of rolling bearings.

When this type of rolling bearing is used in a fan motor, this bearing is incorporated therein so as to be inserted between a motor housing (a fixing member) and a rotation shaft (a rotation member). Specifically, the outer ring 3010 is fitted with and fixed to the motor housing and the inner ring 3020 is fitted with and fixed to the rotation shaft, whereby this shaft is rotatably supported by the rolling bearing.

Here, the fitting engagement between the rolling bearing and the motor housing is set loose in view of assembling convenience. Also, the free side of the rolling bearing is fitted with the motor housing so as to be movable in the axial direction, in order to prevent such an inconvenience that, when the rotation shaft is elongated due to an increase in the temperature caused by the rotation of the fan motor, an excessive axial load can be applied to this rolling bearing.

Therefore, when an imbalance rotation load is applied to the free side of the rolling bearing, there is a possibility that a creep can be generated between the outer circumferential surface 3013 of the outer ring 3010 and the fitting surface (not shown) of the motor housing. When such creep is generated, there is a fear that the fitting surface can be worn and the worn powder of the fitting surface can enter the inside of the rolling bearing.

Accordingly, in order to prevent the generation of such creep, for example, in the example shown in FIG. 16, in the outer circumferential surface 3013 of the outer ring 3010, there are formed ring-shaped recessed grooves extending in the circumferential direction thereof (that is, the grooves which are formed continuously in the circumferential direction of the outer circumferential surface 3013); and, into these recessed grooves 3012, there are fitted elastic members such as O-rings 3030 which are formed continuously in the circumferential direction, whereby the outer ring 3010 is fixed to the motor housing.

Specifically, in the outer circumferential surface 3013 of the outer ring 3010, there are formed multiple recessed grooves 3012 which are spaced from each other in the axial direction, are respectively formed continuously in the circumferential direction of the outer circumferential surface 3013, and each have a rectangular-shaped section in the radial direction thereof. For example, in FIG. 16, there are arranged two recessed grooves 3012 while they are spaced from each other in the axial direction. Further, into these recessed grooves 3012, there are fitted O-rings 3030 respectively. Here, the outer diameter dimension of the O-ring 3030 is set larger than the outer diameter dimension of the outer ring 3010; and, when the O-ring 3030 is fitted into the recessed groove 3012 of the outer ring 3010, the outer diameter side of the O-ring 3030 projects from the outer circumferential surface 3013 of the outer ring 3010 (see the patent reference 1).

According to this structure, the outer diameter side of the O-ring 3030 is interposed between the fitting surface of the motor housing and the outer ring 3010 to generate, between the O-ring 3030 and the fitting surface of the motor housing, a friction force overcoming the relative rotation torque of a creep, thereby preventing the occurrence of the creep.

In this case, since, the larger the projection amount of the O-ring 3030 from the outer circumferential surface 3013 of the outer ring 3010 is, the stronger the above-mentioned friction force is, and the creep resisting property is enhanced. However, when the projection amount is set excessively large, the free-side rolling bearing is unable to move in the axial direction, thereby raising a fear that an excessive axial load can be applied to the rolling bearing. In view of this, according to the patent reference 1, the protrusion amount (projection amount) of the O-ring 3030 mounted on the recessed groove 3012 with respect to the outer circumferential surface 3013 of the outer ring 3010 is set in the range of 4~40% of the wire diameter of the O-ring.

However, although, recently, it has been requested to facilitate the insertion of an O-ring into a recessed groove formed in an outer ring when it is inserted, even the projection amount set in the above range has not been able to provide a satisfactory result.

Fifth Background Art

In the patent reference 1, in order to prevent a creep from occurring between the motor housing and the outer ring of the rolling bearing, there is proposed a method in which there is formed a peripheral groove (a ring-shaped groove) in the outer circumferential surface of the outer ring and an O-ring is fitted into this groove. According to this proposal, the projection amount of the O-ring is set in the range of 4~40% of the diameter of the O-ring, whereby the restoring force of the compressed O-ring is used as a friction force between the outer ring of the bearing and the motor housing to thereby prevent a creep from occurring between them.

However, according to this method, when the outer ring of the bearing is made of steel, the motor housing is made of light alloy such as aluminum, and the ambient environment is high in the temperature (most of bearings for supporting the rotor of an electric motor are used under these conditions), there is a fear that, due to a difference in the coefficients of thermal expansion between the outer ring and the motor housing, the friction force can be reduced to thereby cause a creep to occur.

Also, in the below-cited non-patent reference 1, there is disclosed a method in which a lubricant (grease) is applied between a motor housing and the outer ring of a rolling bearing to thereby provide a creep preventive effect. In this case, from the viewpoint of product management, as the lubricant to be applied between the housing and the outer ring for prevention of a creep, there may be preferably applied the same lubricant as lubricating oil or grease which is used in the inside of the bearing.

Here, as the material of a conventional O-ring, there are available nitrile rubber (acrylonitrile-butadiene rubber: NBR), acrylic rubber, fluoro rubber, silicone rubber and the like; and, in most cases, there is used nitrile rubber which is relatively inexpensive. Also, as the base oil of the lubricating oil and grease that is used in the inside of the rolling bearing, in most cases, there is used ester-system oil. However, since an O-ring made of nitrile rubber is easy to swell and degrade, there has been requested the need to further improve the creep resisting property in the combination of the nitrile rubber O-ring and ester-system oil.

Further, since the rubber material of the O-ring is compressed, it inevitably produces permanent distortion. Thus, in order to maintain the creep resisting property for a long period of time, the permanent distortion must be minimized.

Sixth Background Art

In a rolling bearing for use in, for example, a fan motor or a pump motor, as shown in FIG. 26 which is a section view of the rolling bearing in the radial direction thereof, an outer ring 5010 is disposed so as to cover an inner ring 5020 and an outer circumference of the inner ring 5020 so as to be rotatable relative to the inner ring 5020; an inner ring raceway 5021 is formed continuously in the circumferential direction of the outer diameter surface in the outer diameter surface of the inner ring 5020; an outer ring raceway 5011 extending continuously in the circumferential direction of the inner circumferential surface is formed in the inner circumferential surface of the outer ring 5010; and, between the inner ring raceway 5021 and the outer ring raceway 5011, there are rollably incorporated plurality of rolling elements 5040 while being held at regular intervals by cages 5041.

Further, between the outer ring 5010 and inner ring 5020, there are incorporated seal members 5042 which are used to seal the inside of the rolling bearing on the side surfaces of the rolling bearing. In FIG. 26, as the seal member 5042, there is illustrated a seal member having a shield structure. However, depending on the structures and kinds of rolling bearings, there may also be used a contact seal or a non-contact seal.

Here, as the rolling element 5040, in FIG. 26, there is illustrated a ball; however, depending on the structures and kinds of rolling bearings, there may also be used a roller.

The outer ring 5010 of the rolling bearing is fitted with and fixed to, for example, a housing for storing a fan motor (a motor housing which is not shown) and the inner ring 5020 is fitted with and fixed to the rotation shaft (not shown) of the fan motor, whereby the rotation shaft and the motor housing are rotatably supported by the rolling bearing. Also, the fitting engagement between the rolling bearing and the motor housing is set loose for assembling convenience.

However, there is known a phenomenon, that is, the occurrence of a so called creep that, in a surface where the outer ring 5010 of the rolling bearing and the motor housing are fitted with each other, the fitted and fixed outer ring 5010 is rotated with respect to the rotation direction of the inner ring 5020. When such creep occurs, the fitting surface can be worn away, which often results in the impaired function of the rolling bearing.

In view of this, in order to prevent the occurrence of such creep, in the example shown in FIG. 26, an elastic member (for example, an O-ring 5030 made of rubber having a given level of hardness) is fitted into a recessed groove (peripheral groove) 5012 formed in the outer circumferential surface 5013 of the outer ring 5010, and the outer ring is fixed to the housing owing to the elastic force of this elastic member.

Specifically, in the outer circumferential surface 5013 of the outer ring 5010, there are formed multiple recessed grooves (peripheral grooves) 5012 which are spaced from each other in the axial direction, respectively extend continuously in the circumferential direction of the outer circumferential surface 5013, and also each have a rectangular-shaped section in the radial direction thereof. For example, in FIG. 26, there are arranged two recessed grooves 5012 while they are spaced from each other in the axial direction. Further, O-rings 5030 are respectively fitted into the two recessed grooves 5012. Here, the outer diameter dimension of the O-ring 5030 is set larger than the outer diameter dimension of the outer ring 5010 and thus, when the O-ring 5030 is fitted into the recessed groove 5012 of the outer ring 5010, the outer diameter side of the O-ring 5030 (a portion of the O-ring) projects from the outer circumferential surface 5013 of the outer ring 5010.

When the rolling bearing is fitted into the housing, the outer diameter side of the O-ring 5030 is interposed between the fitting surface of the housing and the outer ring 5010, and the projection amount of the projection portion of the outer diameter side of the O-ring 5030 protruding from the outer circumferential surface 5013 of the outer ring 5010 provides a crushing margin.

When the projection portion is crushed, the elastic force (repulsive force) of the rubber provides a pressing force which pops up toward the fitting surface of the housing. This operation generates, between the O-ring 5030 and the fitting surface of the housing, a friction force overcoming the relative rotation torque of a creep, thereby preventing the occurrence of the creep.

Further, in the patent reference 3, there is provided a method in which the projection amount (crushing margin) of the O-ring from the recessed groove is set in the range of 20%~40% of the diameter of the O-ring to thereby enhance the pressing force thereof. According to this method, while the O-ring 5030 is closely contacted with the outer ring 5010 owing to the pressing force thereof, there is generated a friction force between the outer ring 5010 and housing owing to the elastic force of the rubber, thereby being able to prevent such movement of the relative rotation of the outer ring 5010 that could otherwise be caused by the creep.

However, since the pressing force of the O-ring 5030 can be generated also when the rolling bearing is assembled (inserted) into the housing, when, in order to enhance the pressing force, the projection amount (crushing margin) is increased, the insertion force for inserting the rolling bearing into the housing is increased, thereby raising a fear that the assembling operation can take increased time and labor.

Also, in the insertion operation, the O-ring can be twisted due to the friction force between the fitting surface of the housing and O-ring and, depending on the magnitude of the friction force, the O-ring can be stretched or can be twisted off.

Further, when the projection force (crushing margin) of the O-ring is set so that the insertion force can be reduced, there is a fear that the pressing force of the O-ring in operation can be short.

Patent Reference 1: Japanese Patent Unexamined Publication JP-A-2002-130309
Patent Reference 2: Japanese Patent Unexamined Publication JP-A-2004-176785
Patent Reference 3: Japanese Patent Unexamined Publication JP-A-2005-321006
Non-patent Reference 1: [Creep of Rolling bearing and its Measure], Kikai no Kenkyu, Volume 22, No. 8 (1970), written by Michiie and Isihara.

DISCLOSURE OF THE INVENTION

Problems that the Invention is to Solve

With reference to the above-mentioned first background art, creep torque M can be calculated by multiplying centrifugal force P, the radius of an outer ring D and friction coefficient $\mu$; and, the creep torque M can be expressed, for example, by an equation: $M=\mu \cdot P \cdot (D/2)$.

In this case, when the radius (D/2) and the centrifugal force P in a given rotational movement are regarded as constants, in order to control the creep torque M down to a small value, it can be seen that the value of the friction coefficient $\mu$, which is only variable, may be controlled down to a small value.

A first object of the invention, in view of the above-mentioned first background art, is to provide a rolling bearing which can restrict the occurrence of a creep as much as possible and also, when a creep occurs, can reduce a creep torque.

A second object of the invention, in view of the above-mentioned second background art, is to provide a rolling bearing which not only, when inserting it into a motor housing, can maintain a good insertion property but also can maintain a stable creep-resisting property.

A third object of the invention, in view of the above-mentioned third background art, is to provide a rolling bearing which can prevent the occurrence of a creep between an O-ring and a groove for mounting such O-ring thereon to thereby be able to provide a long and stable creep preventive effect.

A fourth object of the invention, in view of the above-mentioned fourth background art, is to provide a rolling bearing which can maintain its creep-resisting property at a constant level and also can facilitate the insertion of the rolling bearing when it is inserted into between a fixed member and a rotation member.

A fifth object of the invention, in view of the above-mentioned fifth background art, is to provide a rolling bearing which, even when it is used in a state where a lubricant containing ester-system oil is applied to an O-ring fitted into a peripheral groove formed in the outer circumferential surface of an outer ring, can prevent the occurrence of a creep between the outer ring and a housing for a long period of time.

A sixth object of the invention, in view of the above-mentioned sixth background art, is to provide a rolling bearing which, when inserting it into a housing, can reduce the insertion force thereof, can prevent an O-ring from twisting, and, after it is assembled into the housing, can prevent the occurrence of a creep due to the sufficient pressing force of the O-ring.

Means for Solving the Problems

In attaining the first object, according to the invention, there is provided a rolling bearing, including:

an outer ring and an inner ring disposed rotatable relative to each other;

a plurality of rolling elements incorporated rollably between the outer and inner rings;

a housing into which the outer ring fits; and a shaft into which the inner ring fits, the rolling bearing supports rotation between the shaft and housing, wherein an O-ring made of an elastic member is disposed between a fitting surface of the housing and an outer circumferential surface of the outer ring and/or between a fitting surface of the shaft and the inner circumferential surface of the inner ring, the O-ring reduces has a reduced friction coefficient between the fitting surface of the housing and the outer circumferential surface of the outer ring or between the fitting surface of the shaft and the inner circumferential surface of the inner ring.

According to the present invention, the O-ring may be formed in a ring shape that can be fitted with the outer circumferential surface of the outer ring and may include at least a contact portion which line-contacts with the fitting surface of the housing.

According to the present invention, the section of the O-ring in the radial direction thereof may also be formed in a polygonal shape.

According to the present invention, the number of vertexes of the section polygonal shape may also be an odd number.

According to the present invention, in the outer circumferential surface of the outer ring, there may be formed a recessed groove which extends continuously in the circumferential direction of the outer circumferential surface and into which the O-ring can be fitted; and, the O-ring may be fixed to the recessed groove.

According to the present invention, the recessed groove may include an internal bottom surface and two rising surfaces respectively rising up from the two ends of the internal bottom surface; and, the respective vertexes of the O-ring may be supported by the rising surfaces so as to be contacted with the rising surfaces.

According to the present invention, the width dimension between the rising surfaces rising up from the two ends of the internal bottom surface of the recessed groove may also be set such that it is wider toward the internal bottom surface.

According to the present invention, the rolling bearing may also be used in a fan motor.

According to the present invention, in the fan motor, the outer ring may be fitted into the housing of the motor and the inner ring may be fitted with the shaft, so that the rolling bearing support rotation between the shaft and the motor housing.

In attaining the second object, according to the invention, there is provided a rolling bearing, including:

an outer ring including an outer ring raceway formed in an inner circumferential surface thereof;

an inner ring including an inner ring raceway formed in an outer circumferential surface thereof;

plurality of rolling elements interposed rollably between the outer ring raceway and inner ring raceway;

a ring-shaped recessed groove formed in the outer circumferential surface of the outer ring along a circumferential direction thereof; and a ring-shaped O-ring fitted into the recessed groove such that the outer circumferential surface thereof projects from the recessed groove, wherein an interference relationship between a inner diameter ($D2$) of the O-ring and a diameter ($D1$) of the recessed groove of the outer circumferential surface of the outer ring is set so as to satisfy $D1 \geqq 1.07 \times D2$.

In attaining the third object, according to the invention, there is provided a rolling bearing, including:

first and second raceway rings disposed rotatable relative to each other; and a plurality of rolling elements interposed rollably between the first and second raceway rings, wherein one of the first and second raceway rings is fitted with a fixed portion, the other one of the first and second raceway rings is fitted with a rotation portion, at least one of the first and second raceway rings includes a groove which is formed so as to extend continuously in the circumferential direction of the peripheral surface of the raceway ring disposed opposed to the fixed portion or rotation portion and into which an O-ring is mounted, and a roughness Ra of the internal surface of the groove is set 0.05 μm or more.

According to the present invention, the roughness of the internal surface of the groove may also be set larger than the roughness of the fitting surface of the fixed portion or rotation portion disposed opposed to the groove.

In attaining the fourth object, according to the invention, there is provided a rolling bearing, including:

first and second raceway rings disposed rotatable relative to each other; and, a plurality of rolling elements interposed rollably between the first and second raceway rings, wherein one of the first and second raceway rings is fitted with a fixed portion, the other one of the first and second raceway rings is fitted with a rotation portion, wherein at least one of the first and second raceway rings includes an elastic member which is disposed along the circumferential direction of the peripheral surface of the raceway ring disposed opposed to the fitting surface of the fixed portion or rotation portion and which is interposed between the peripheral surface and the fitting surface of the fixed portion or rotation portion, and the elastic member is capable of forming an gap airtightly sealed from an outside.

According to the present invention, the elastic member may also be formed to extend intermittently in the circumferential direction of the peripheral surface disposed opposed to the fitting surface.

According to the present invention, the elastic member may also be formed to extend continuously in the circumferential direction of the peripheral surface disposed opposed to the fitting surface.

According to the present invention, in at least one of the first and second raceway rings, there may be provided a groove so formed as to extend continuously in the circumferential direction along the peripheral surface disposed opposed to the fixed portion or rotation portion, and the elastic member may also be mounted on the groove.

According to the present invention, the elastic member may also be an O-ring which is formed to extend continuously in the circumferential direction of the peripheral surface disposed opposed to the fitting surface.

In attaining the fifth object, according to the invention, there is provided a rolling bearing, including:

an O-ring made of nitrile rubber fitted into a peripheral groove formed in an outer circumferential surface of an outer ring, wherein a tensile permanent distortion rate of the nitrile rubber is 3% or less, and a dimension change rate of the nitrile rubber is 2% or less after immerging in ester-system oil for 1000 hours or so.

According to the present invention, the nitrile rubber constituting the O-ring may also have an acryl nitrile content of 40 mass % or less and a coefficient of line expansion in the range of $2.2 \times 10^{-5}/°C. \sim 10 \times 10^{-5}/°C$.

In attaining the sixth object, according to the invention, there is provided a rolling bearing, including:

an outer ring and an inner ring disposed rotatable relative to each other;

a plurality of rolling elements incorporated rollably between the outer and inner rings;

a housing into which the outer ring fits;

a shaft into which the inner ring fits;

a recessed groove formed in one or both of an outer circumferential surface of the outer ring and an inner circumferential surface of the inner ring so as to extend continuously in a circumferential direction thereof; and an O-ring made of an elastic member accommodated in the recessed groove so that a portion thereof projects from the recessed groove, wherein the rolling bearing supports rotation between the shaft and housing, the recessed groove includes a first bottom surface having a given depth and a second bottom surface having a larger depth than the first bottom surface, the O-ring has a clearance with respect to the second bottom surface, and dimension of the clearance is smaller than a projection amount of the projecting portion when the projecting portion of the O-ring is not pressed, and the O-ring has a portion which elastically deformed and contacted with the second bottom surface when the projecting portion is pressed.

According to the present invention, the O-ring may also include a first surface to be fitted with the first bottom surface of the recessed groove, and a second surface which is extended in the outside radial direction of the first surface or in the inside radial direction thereof and also which, when the O-ring is not pressed, has a clearance with respect to the second bottom surface of the recessed groove, and, when the O-ring is pressed, can be contacted with the second bottom surface.

According to the present invention, the rolling bearing may also be used in a fan motor.

According to the present invention, in the fan motor, the outer ring may also be fitted into the fan motor housing and the inner ring may also be fitted with the fan motor shaft, whereby the rolling bearing supports rotation between the fan motor shaft and the fan motor housing.

Effects of the Invention

According to the invention, there is provided a rolling bearing which can restrict the occurrence of a creep as much as possible and also can reduce a creep torque when a creep occurs.

Also, according to the invention, the O-ring has such a structure as can firmly fasten the bottom surface of the recessed groove formed in the outer circumferential surface of the outer ring. Owing to this, even when an imbalance rotation load is applied to the rolling bearing, a creep is hard to occur between the O-ring and the recessed groove of the outer circumferential surface of the outer ring, thereby the stable creep-resisting property of the rolling bearing is maintained.

Further, according to the invention, it is possible to prevent the occurrence of a creep between the O-ring and the groove for mounting the O-ring thereon, and there is provided a rolling bearing which can fulfill a long and stable creep preventive effect.

According to the invention, it is possible to provide a rolling bearing which can maintain its creep-resisting property at a constant level and also, when it is inserted into between the fixed member and rotation member, can facilitate the insertion operation.

Further, according to the rolling bearing of the invention, since the O-ring fitted into the peripheral groove formed in the outer circumferential surface of the outer ring is made of nitrile rubber having a tensile permanent distortion rate of 3% or less and also, having a dimension change rate of 2% after being immersed in ester-system oil about 1000 hours, even when a lubricant containing ester-system oil is applied to this O-ring in use, the occurrence of a creep between the housing and the outer ring can be prevented for a long period of time.

Still further, according to the invention, there can be provided a rolling bearing which, when it is inserted into the housing, can minimize the insertion force thereof, can prevent the O-ring from twisting, and, after it is inserted into the housing, can prevent the occurrence of a creep due to a sufficient pressing force.

DESCRIPTION OF REFERENCE NUMERALS

Figure 1:
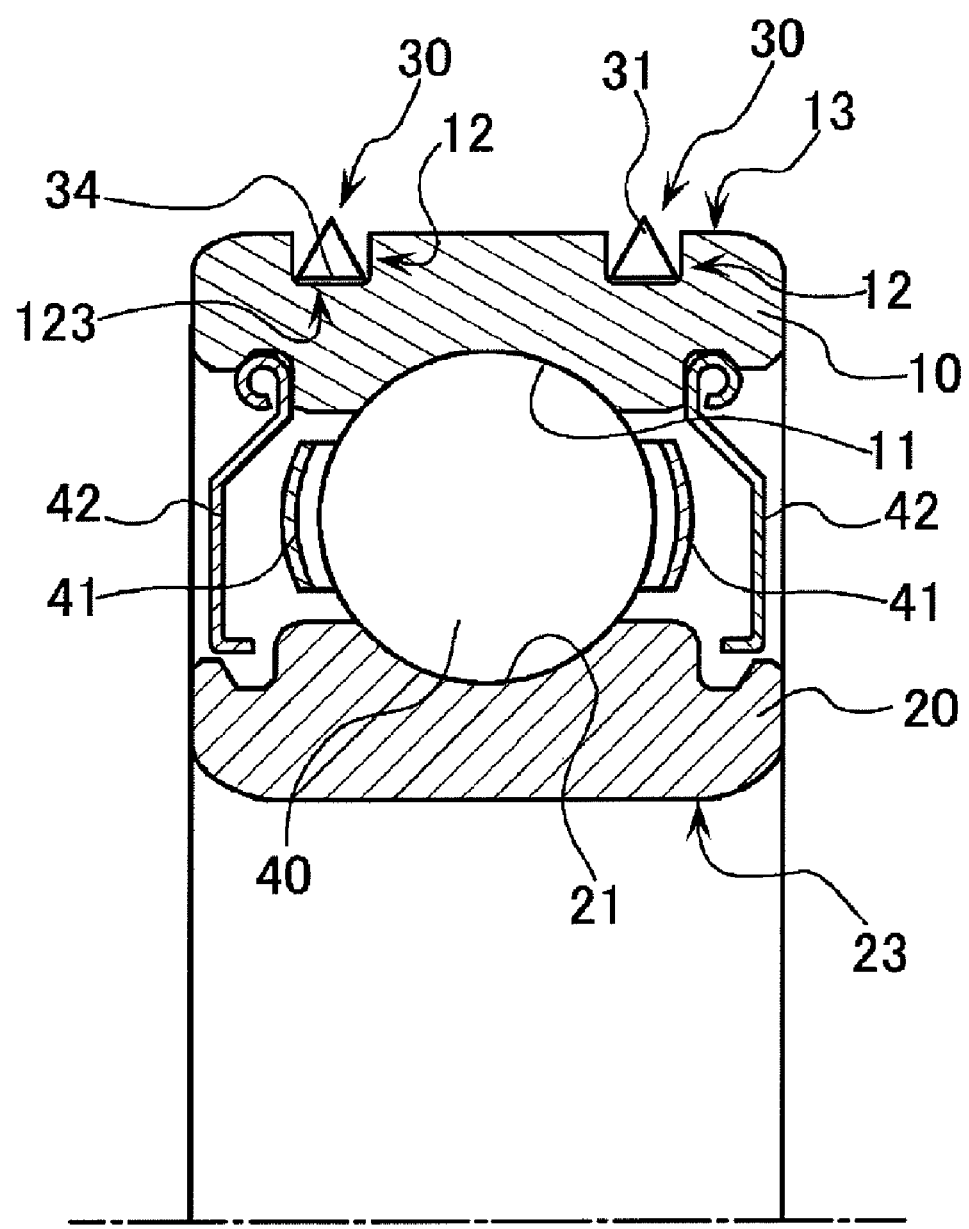
FIG. 1 is a section view of a rolling bearing according to a first embodiment of the invention.

10: Outer ring
20: Inner ring
30: O-ring
40: Rolling element
1001: Outer ring
1002: Inner ring
1003: Rolling element
1004: Cage
1005: Seal member
1010: Recessed groove
1011: O-ring
2010: Outer ring
2020: Inner ring
2030: O-ring
2040: Rolling element
3010: Outer ring
3020: Inner ring
3030: O-ring
3031: Gap
3040: Rolling element
4001: Inner ring
4002: Outer ring
4021: Peripheral groove
4003: Ball
4004: Cage
4005: Shield plate
4006: O-ring
5010: Outer ring
5012: Recessed groove
5013: Outer ring outer circumferential surface
5020: Inner ring
5023: Inner ring inner circumferential surface
5030: O-ring
5032: Inner diameter of O-ring
5040: Rolling element

BEST MODE FOR CARRYING OUT THE INVENTION

First Embodiment

Now, description will be given below of a first embodiment of the invention with reference to the accompanying drawings.

The present invention relates to a rolling bearing incorporated into a fan motor or the like. Especially, the present rolling bearing is characterized in a structure of an O-ring 30 serving as creep preventing means which is interposed between the fitting surface of the motor housing of the fan motor and the outer circumferential surface 13 of an outer ring 10 and/or between the fitting surface of a rotation shaft and the inner circumferential surface 23 of an inner ring 20. That is, the O-ring 30 is made of an elastic member which has a small friction coefficient between the fitting surface of the motor housing and the outer circumferential surface 13 of the outer ring 10 and/or between the fitting surface of the rotation shaft and the inner circumferential surface 23 of the inner ring 20, and also can provide a reduced creep torque. Next, description will be given below in detail of a specific embodiment of the invention with reference to FIGS. 1 to 5.

Here, since the bearing structure except for the O-ring 30 can employ various bearing structures such as a bearing structure according to the above-mentioned first background art, description will be given here mainly of the O-ring 30 that has the characteristic structure of the invention and thus the description of the remaining structures is omitted. In FIGS. 1 to 5, the O-ring 30 is structured in the following manner. That is, it is formed as a circular ring which can be fitted with the outer circumferential surface 13 of the outer ring 10 and also the radial direction section of which has a polygonal shape. Further, the O-ring 30 includes a contact portion which can line-contact with at least the fitting surface of the housing or rotation shaft.

FIG. 1 shows a first embodiment of the invention. In the present embodiment, there is illustrated an example in which, in order to prevent the occurrence of a creep between the fitting surface of the motor housing and the outer circumferential surface 13 of the outer ring 10, the O-ring 30 is fitted into a recessed groove 12 formed in the outer circumferential surface 13 of the outer ring 10.

In the O-ring 30 according to the present embodiment, when it is cut in the radial direction thereof, the section has a polygonal shape, for example, a triangular shape as an example of an odd polygonal shape; and, the triangular shape is made to continue in the circumferential direction of the O-ring, whereby the O-ring 30 is formed to have a circular shape. Here, the specific shape of the triangle is not limited to the illustrated example but the design of the shape can be changed without departing from the scope of the invention.

Further, the O-ring 30 is fitted into the recessed groove 12 so that the triangular-shaped bottom side 34 of the O-ring 30 is contacted with the internal bottom surface 123 of the recessed groove 12, and the vertex 31 (which is formed in a ring-like shape and continues at the same height in the circumferential direction of the O-ring 30) disposed opposed to the bottom side 34 projects outwardly from within the recessed groove 12 and is line contacted with the fitting surface of the motor housing. Therefore, according to the present embodiment, the vertex 31 functions as the contact portion of the O-ring 30. However, the angle of the vertex forming the triangular shape is not limited to a specific angle but it can be changed without departing from the scope of the invention.

According to the present structure, when the rolling bearing is fitted into and fixed to the motor housing, between the outer circumferential surface 13 of the outer ring 10 and the fitting surface of the motor housing, there is interposed the contact portion (vertex 31) of the O-ring 30 which projects from the outer circumferential surface 13 of the outer ring 10. Since the contact portion is formed by the vertex 31 which continues in the circumferential direction of the O-ring 30, even when it is taken into account that the O-ring 30 is deformed into a crushed shape due to the fitting and fixation thereof, the O-ring 30 is contacted (line contacted) with the fitting surface of the motor housing in a narrow area, when compared with a structure in which the O-ring 30 has a circular-shaped radial direction section. Therefore, the small contact area of the O-ring 30 reduces the contact friction thereof, thereby being able to reduce a friction coefficient μ between the outer ring 10 and the motor housing. Thus, a creep torque when a creep occurs can be controlled to suppress to a relatively small torque. Here, since the O-ring 30 is contacted with the fitting surface of the motor housing to thereby fix the outer ring 10, the occurrence of a creep can be restricted as much as possible.

Figure 2:
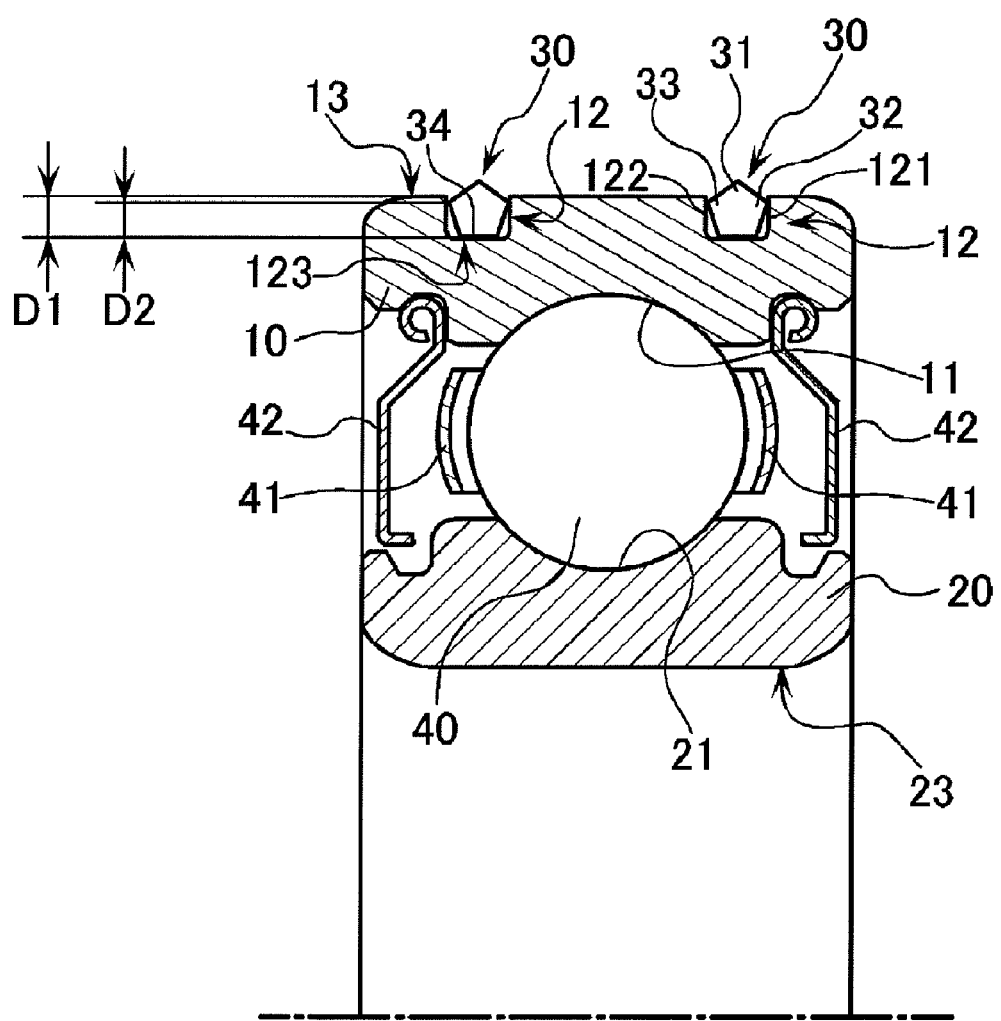
FIG. 2 is a section view of a rolling bearing according to a first modification of the first embodiment of the invention.

Also, the invention is not limited to the above-mentioned embodiment but it may also be modified in the following manner. Referring to a first modification of the embodiment, an O-ring 30 shown in FIG. 2 is structured such that the section thereof (when it is cut in the radial direction thereof) has a pentagonal shape (one of odd polygonal shapes), and the pentagonal shape continues in the circumferential direction of the O-ring 30 to thereby form a circular shape. Here, the specific shape of the pentagon is not limited to the example shown in FIG. 2, but the design thereof can be changed without departing from the scope of the invention.

In this case, the O-ring 30 is fitted into the recessed groove 12 so that the bottom side 34 of the pentagon is contacted with the internal bottom surface 123 of the recessed groove 12, and also the vertex 31 of the pentagon disposed opposed to the bottom side 34 projects outwardly from within the recessed groove 12 and is line contacted with the fitting surface of the housing to thereby function as a contact portion. Here, the angle of the vertex 31 (contact portion) is not limited to a specific angle but the design thereof can be changed without departing from the scope of the invention. Thus, since the contact portion (vertex 31) and the fitting surface of the motor housing are contacted (line contacted) with each other in a narrow area, the contact friction between them can be reduced.

Also, according to the present embodiment, the distance D2 between the two vertexes 32, 33 of the pentagon, which constitute the whole width of the pentagon, and the internal bottom surface 123 of the recessed groove 12 is set smaller than the depth D1 of the recessed groove 12.

According to this structure, when, to the O-ring 30, there is applied such stress as shifts it in the axial direction thereof, since the two vertexes 32, 33 constituting the whole width of the pentagon are contacted with and supported by the rising surfaces 121, 122 that rise up from the two ends of the internal bottom surface 123 of the recessed groove 12, the O-ring 30 is prevented from shifting from the recessed groove 12, thereby being able to stabilize the fitting engagement between the O-ring and the motor housing.

Here, in order that, when such stress as to shift the O-ring 30 is applied to the O-ring 30, the two vertexes 32, 33 of the O-ring 30 can be supported by the rising surfaces 121, 122, the width dimension of the recessed groove 12 may be set equal to or slightly larger than the width of the O-ring 30. Here, the remaining structures and operation effects of the present modification are similar to those of the above-mentioned embodiment and thus the description thereof is omitted here.

Figure 3:
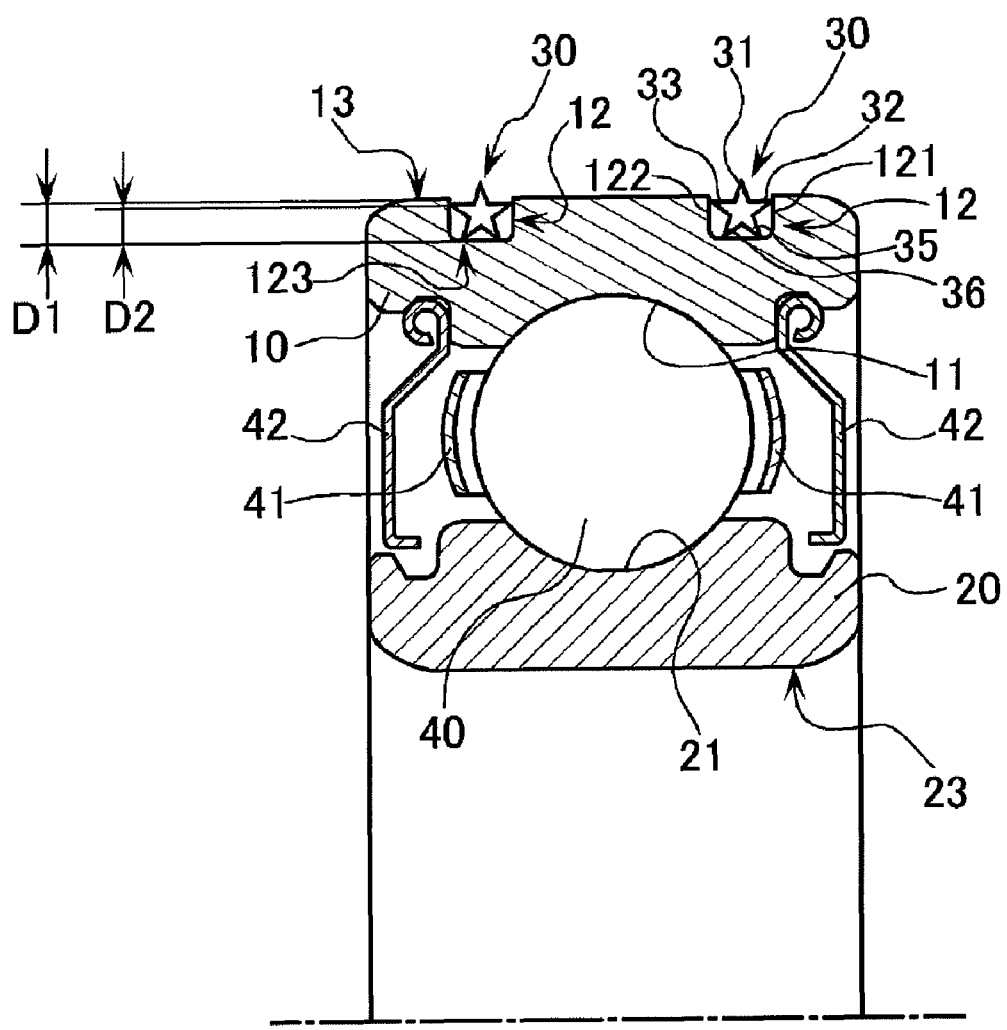
FIG. 3 is a section view of a rolling bearing according to a second modification of the first embodiment of the invention.

Also, the invention may also be modified in the following manner. As an example of such modification, an O-ring 30 shown in FIG. 3 is structured such that, when it is cut in the radial direction thereof, the section thereof has a star shape, and the star shape extends continuously in the circumferential direction of the O-ring 30 to thereby form a circular shape. Here, the specific shape of the star is not limited to the example shown in FIG. 3, but the design thereof can be changed without departing from the scope of the invention.

In this case, the two vertexes 34, 35, which are arranged facing downwardly in FIG. 3, of the star shape are fitted with the internal bottom surface 123 of the recessed groove 12, and the vertex 31 disposed opposed to the two vertexes 34, 35 projects outwardly from within the recessed groove 12 and is line contacted with the fitting surface of the housing to thereby function as a contact portion. Here, the angle of the vertex 31 (contact portion) forming the star shape is not limited to a specific angle but the design thereof can be changed without departing from the scope of the invention. Thus, since the contact portion (vertex 31) and the fitting surface of the housing are contacted (line contacted) with each other in a narrow area, the contact friction between them can be reduced.

In this case as well, similarly to the structure in which the radial-direction section of the O-ring 30 has a pentagonal shape, the distance D2 between the two vertexes 32, 33 constituting the whole width of the star shape and the internal bottom surface 123 of the recessed groove 12 may preferably be set smaller than the depth D1 of the recessed groove 12. Here, the remaining structures and operation effects of the present modification are similar to those of the above-mentioned embodiment and thus the description thereof is omitted here.

Further, in the above-mentioned embodiment, the respective vertexes of the polygonal shape forming the radial direction section of the O-ring 30 may also be formed in a smooth manner. For example, FIG. 4 shows a third modification in which the respective vertexes of the star-shaped radial direction section are formed smooth.

Figure 4:
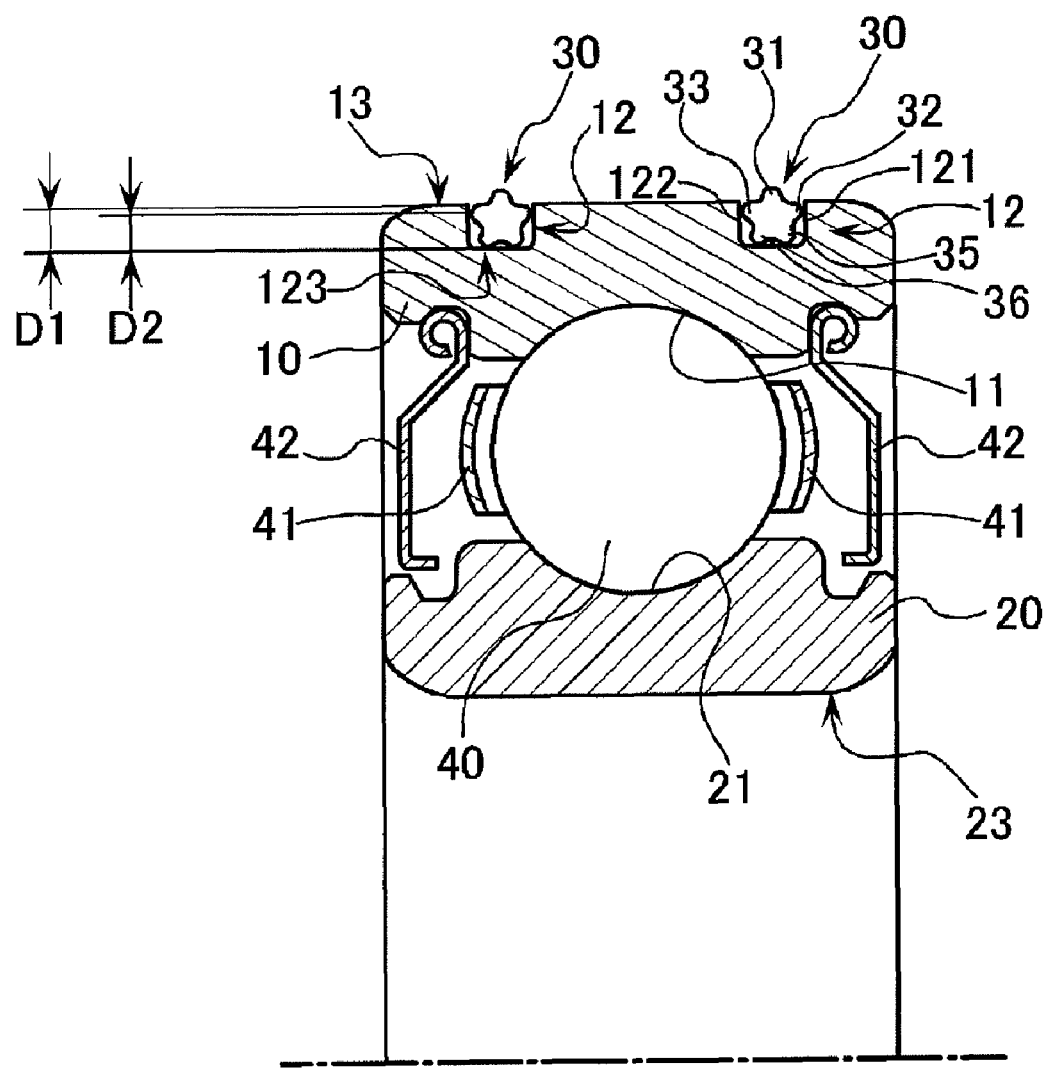
FIG. 4 is a section view of a rolling bearing according to a third modification of the first embodiment of the invention.

In this case as well, similarly to the structure in which the radial direction section of the O-ring 30 has a star shape, the O-ring 30 is fitted into the recessed groove 12 so that the two vertexes, which are disposed facing downwardly in FIG. 4, of the star shape with their vertexes formed smooth are contacted with the internal bottom surface 123 of the recessed groove 12, and the vertex 31 disposed opposed to these two vertexes projects outwardly from within the recessed groove 12 and is line contacted with the fitting surface of the housing to thereby function as the contact portion of the O-ring 30. Thus, since the contact portion (vertex 31) and the fitting surface of the housing are contacted (line contacted) with each other in a narrow area, the contact friction between them can be reduced.

Also, similarly to the structure in which the radial direction section of the O-ring 30 has a pentagonal shape, the distance D2 between the two vertexes 32, 33 constituting the whole width of the star shape with their vertexes formed smooth and the internal bottom surface 123 of the recessed groove 12 may preferably be set smaller than the depth D1 of the recessed groove 12. Here, the remaining structures and operation effects of the present modification are similar to those of the above-mentioned embodiment and thus the description thereof is omitted here.

In the above-mentioned respective examples, as regards the whole shape of the O-ring 30, it is formed in a circular shape the section of which has a polygonal circular shape. However, the section shape may also be other shape than the polygonal shape. That is, the section shape of the O-ring 30 is not limited to a specific section shape, provided that the O-ring 30 is formed in a circular shape and includes at least a contact portion which can be line contacted with the fitting surface of the motor housing. For example, although not shown in the drawings, the O-ring 30 may also be formed in a circle the section of which has a circular section and may include on the outer periphery thereof a projecting strip portion extending continuously in the circumferential direction thereof, while the leading end (vertex) of the projecting strip portion can be line contacted with the fitting surface of the motor housing.

Also, in the present embodiment, description has been given hereinbefore of an example which includes a single contact portion extending continuously in the circumferential direction; however, there can also be provided two or more contact portions of this type without departing from the scope of the invention.

Also, referring to the material of the O-ring 30, in the above-mentioned embodiment, there is illustrated elastic material such as rubber or resin. However, the property or hardness of the elastic material required varies depending on the installation environment of the rolling bearing and also on the use of the rolling bearing, and it is possible to select the material that can satisfy such requirements; and thus, the material is not limited to specific one here. For example, in the above embodiment, the contact portion (vertex 31) of the O-ring 30 and the fitting surface of the motor housing are contacted (line contacted) with each other in a narrow area to thereby reduce the contact friction between them. However, in addition to the above shape characteristic of the O-ring 30, as the material of the O-ring 30, there can also be selected such material as having a low friction coefficient.

Also, in the above embodiment, since the recessed groove 12, into which the O-ring 30 of the rolling bearing is to be fitted, is formed such that the radial direction section thereof has a rectangular shape, the O-ring 30 can be firmly fixed to the recessed groove 12. For example, describing the structure shown in FIG. 1 in which the O-ring 30 having a triangular-shaped radial direction section is fitted into the recessed groove 12, the O-ring 30 is fitted into the recessed groove 12 so that the bottom side 34 of the triangular shape of the O-ring 30 is contacted with the internal bottom surface 123 of the recessed groove 12. Thus, since the internal bottom surface 123 of the recessed groove 12 and the O-ring 30 are contacted with each other in a wide area, the O-ring 30 can be firmly closely contacted with the outer ring 10 owing to the pressing force of the elastic material of the O-ring 30. Therefore, between the internal bottom surface 123 and O-ring 30, there is applied a large friction force, so that they can be strongly fixed to each other. Here, as regards the number and forming interval of the recessed grooves 12, in the present embodiment, there is shown an example in which there are arranged two recessed grooves spaced from each other in the axial direction of the rolling bearing. However, the number of the recessed grooves 12 can be increased or decreased according to the installation environment and use of the rolling bearing.

Figure 5:
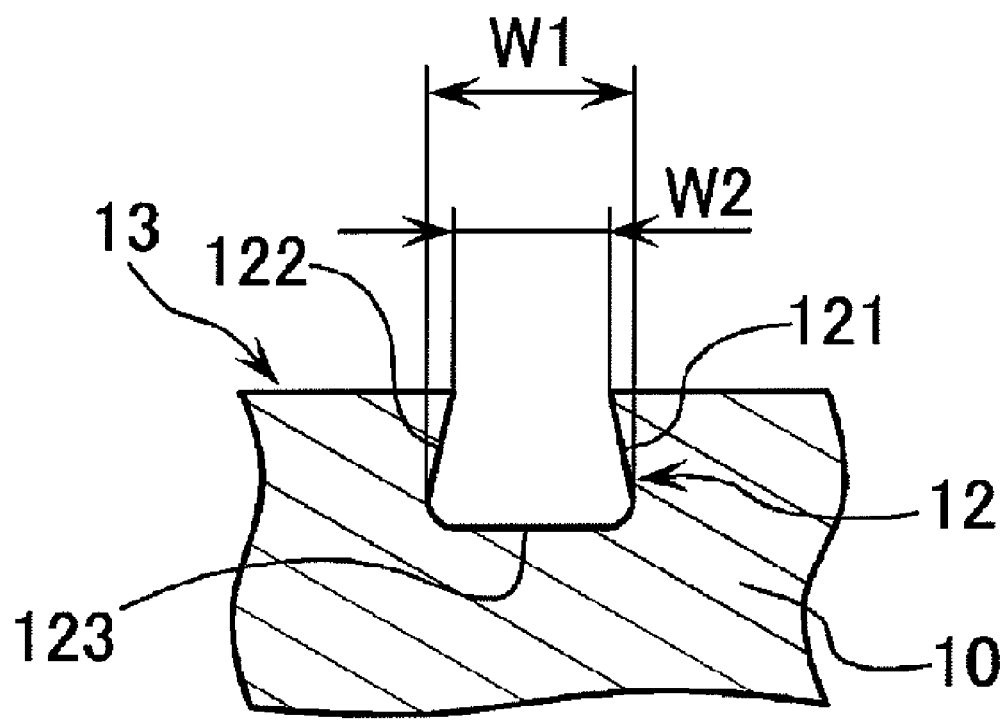
FIG. 5 is a section view of another shape of a recessed groove formed in the first embodiment of the invention.
Figure 6:
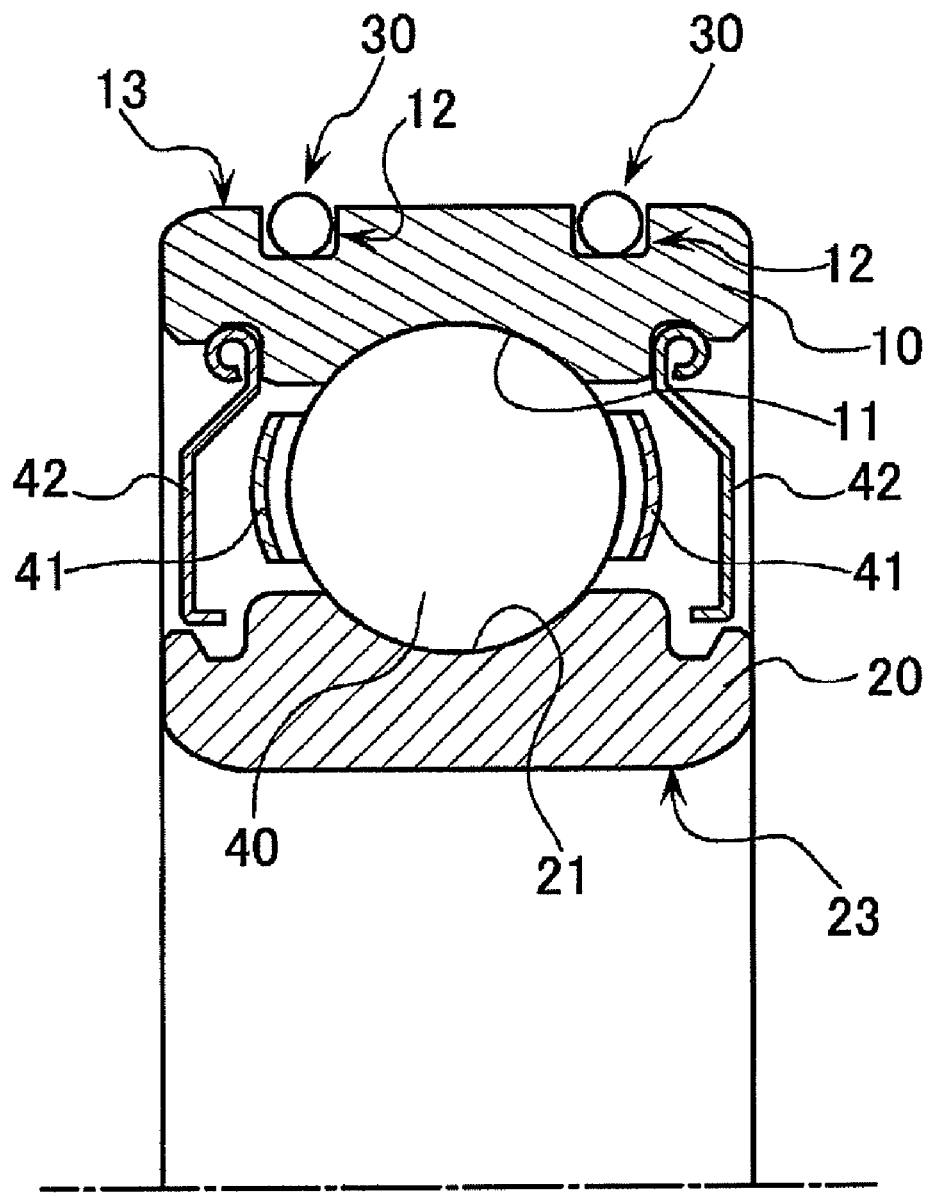
FIG. 6 is a section view of a conventional rolling bearing.

Also, in the above-mentioned embodiment, description has been given hereinbefore of a case in which the radial direction section of the recessed groove 12 has a rectangular shape. However, the rising surfaces 121, 122 of the recessed groove 12 may not have an angle perpendicular to the outer circumferential surface 13 of the outer ring 10 but, for example, the width dimension between the rising surfaces 121, 122 of the recessed groove 12 may also be set wider toward the internal bottom surface 123. Specifically, as shown in FIG. 5, the width dimension between the rising surfaces 121, 122 of the recessed groove 12 is set in a so called dovetail groove manner in which the width dimension W1 on the internal bottom surface 123 side is set wider than the width dimension W2 on the outer circumferential surface 13 side of the outer ring 10. According to this structure, in the width dimension between the rising surfaces 121, 122, the width dimension on the outer circumferential surface 13 side is narrower than the width dimension on the internal bottom surface 123 side. Therefore, when the O-ring 30 is fitted into the recessed groove 12, the two vertexes (for example, in FIG. 2, reference numerals 32, 33) constituting the whole width of the O-ring 30 are supported by the rising surfaces 121, 122 on the outer circumferential surface 13 side of the recessed groove 12 so that the vertexes 32, 33 are always contacted with the rising surfaces 121, 122; and, even when, to the O-ring 30, there is applied such stress as shifts it in the axial direction thereof, the O-ring 30 is prevented from shifting from the recessed groove 12, thereby being able to stabilize their fitting engagement further.

Further, in the present embodiment, there is shown an example in which the O-ring 30 is fitted into the outer circumferential surface 13 of the outer ring 10. However, instead of this, it also falls within the scope of the invention that, in the fitting surface of the motor housing, there is formed a recessed groove 12 extending continuously in the circumferential direction of the fitting surface and the O-ring 30 is fitted into this recessed groove 12. Also, it also falls within the scope of the invention that the O-ring 30 is provided on the inner circumferential surface 23 of the inner ring 20 or on the rotation shaft side.

Also, when the recessed groove 12 is not provided, for example, the O-ring 30 may be fitted directly with the outer circumferential surface 13 of the outer ring 10 or the like.

Second Embodiment

Now, description will be given below of a rolling bearing according to a second embodiment of the invention with reference to the accompanying drawings.

Figure 7A:
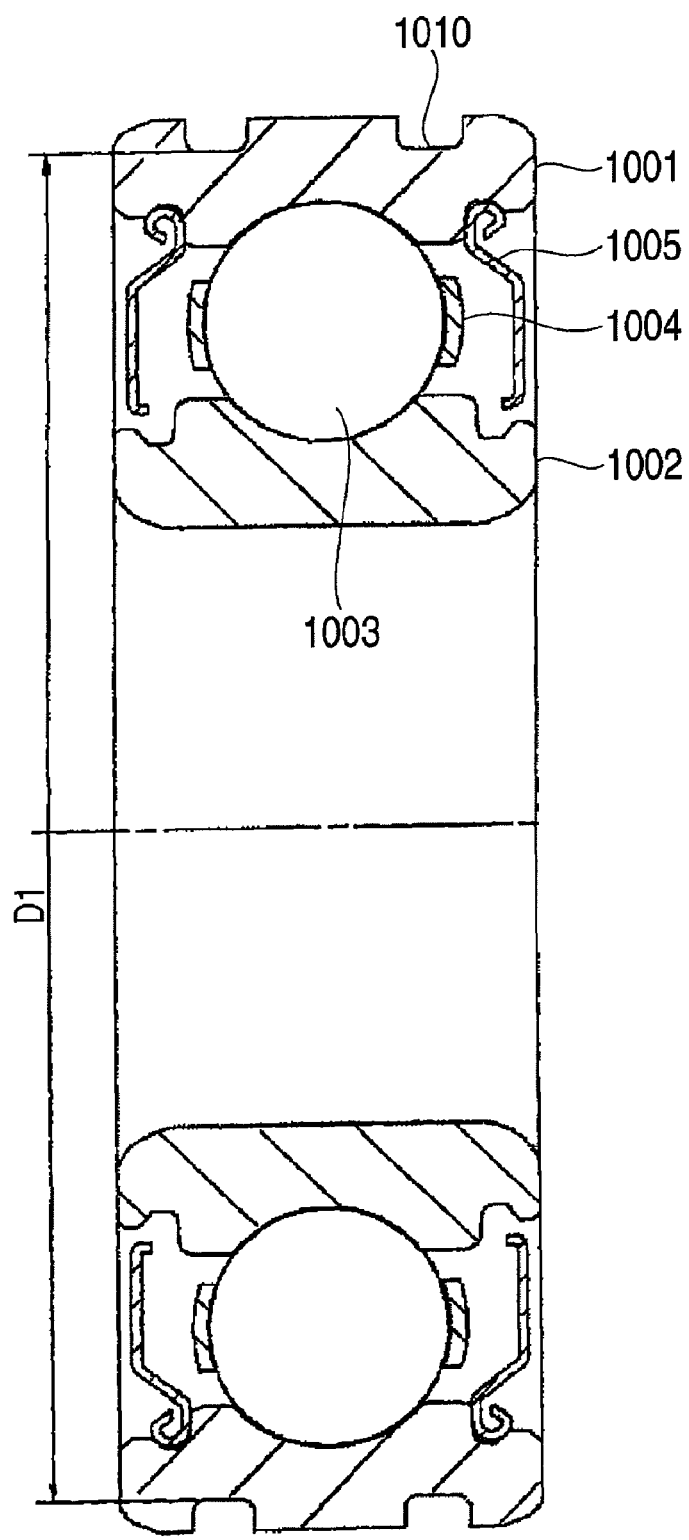
FIG. 7A is a section view of a rolling bearing according to a second embodiment of the invention.
Figure 7B:
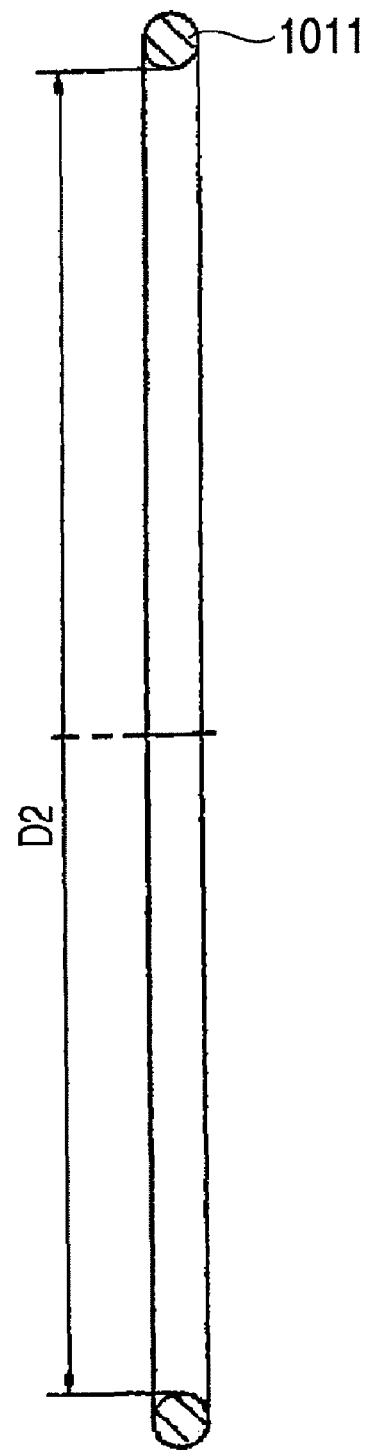
FIG. 7B is a section view of an O-ring according to the second embodiment of the invention.

FIG. 7A is a section view of a rolling bearing according to a second embodiment of the invention, and FIG. 7B is a section view of an O-ring.

A rolling bearing according to the second embodiment of the invention includes an outer ring 1001 having an outer ring raceway formed in the inner circumferential surface thereof, an inner ring 1002 having an inner ring raceway formed in the outer circumferential surface thereof, and plurality of rolling elements 1003 rollably interposed between the outer ring raceway and inner ring raceway. The present rolling bearing further includes a cage 1004 for holding the rolling elements 1003 at a given interval, and seal members 1005 respectively disposed on the two end portions of the outer ring 1001 and inner ring 1002.

In the outer circumferential surface of the outer ring 1001, there are arranged a pair of ring-shaped recessed grooves 1010 respectively formed along the circumferential direction thereof, and, into each of the paired recessed grooves 1010, there is fitted a ring-shaped O-ring 1011 the outer circumferential surface of which projects from within the recessed groove 1010.

According to the present embodiment, the interference relationship between the inner diameter (D2) of the O-ring 1011 and the diameter (D1) of the recessed groove 1010 of the outer circumferential surface of the outer ring 1001 is set so as to satisfy $D1 \geqq 1.72 \times D2$.

Therefore, the present rolling bearing is structured such that the O-ring 1011 fastens firmly the bottom surface of the recessed groove 1010 of the outer circumferential surface of the outer ring 1001. Thus, even when an imbalance rotation load is applied to the rolling bearing, a creep is hard to occur between the O-ring 1011 and the recessed groove 1010 of the outer circumferential surface of the outer ring 1001, which makes it possible to maintain a stable creep-resisting property. However, when the interference is excessive large, there is raised a possibility that it is difficult to assemble the O-ring into the recessed groove, or the durability of the O-ring itself can be impaired. In view of this, preferably, the interference may be set such that $D1 \leqq 1.10 \times D2$, more preferably, $D1 \leqq 1.08 \times D2$.

(Creep Test)

While there was prepared a rolling bearing in which the interference between the inner diameter (D1) of the O-ring and the diameter (D2) of the recessed groove of the outer circumferential surface of the outer ring is set in the following manner, there was conducted a creep test on the rolling bearing.

(Bearing Evaluated)

Deep groove ball bearing (inner diameter: 20 mm, outside diameter: 47 mm, and width: 14 mm)

(1) Bearing in which interference is set 7% or more (an embodiment according to the invention)
(2) Bearing in which interference is set 6% or less (a comparison example)

(Evaluation Contents)

Creep Test

An imbalance load was applied to the above rolling bearings, where a load at the time when a creep starts was regarded as a creep limit load (a creep-resisting force).

(Evaluation Results)

Figure 8:
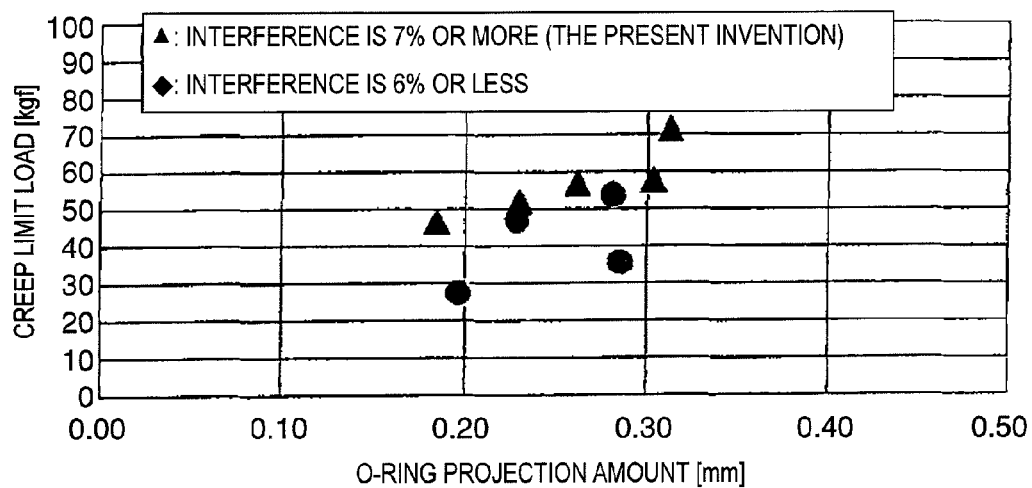
FIG. 8 is a graph of the relationship between an O-ring projection amount and a creep limit load (a creep-resisting force)

FIG. 8 is a graph of the relationship between an O-ring projection amount and a creep-resisting load (a creep-resisting force). From the results shown in FIG. 8, it has been confirmed that the embodiment of the invention can maintain a stable creep-resisting property.

Here, the invention is not limited to the above embodiments but it can be changed variously.

Third Embodiment

Now, description will be given below of a third embodiment according to the invention with reference to the accompanying drawings.

Figure 9:
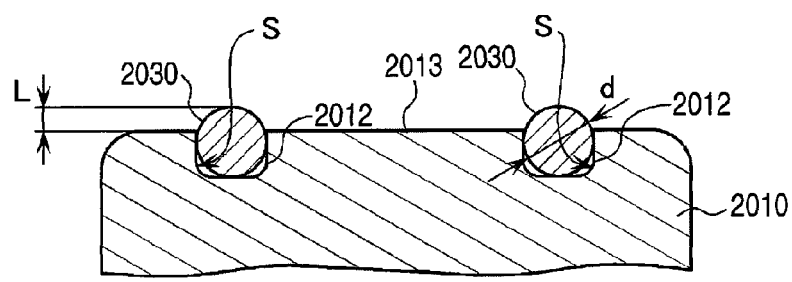
FIG. 9 is a partially enlarged view of the outer diameter side of an outer ring according to a third embodiment of the invention.
Figure 11:
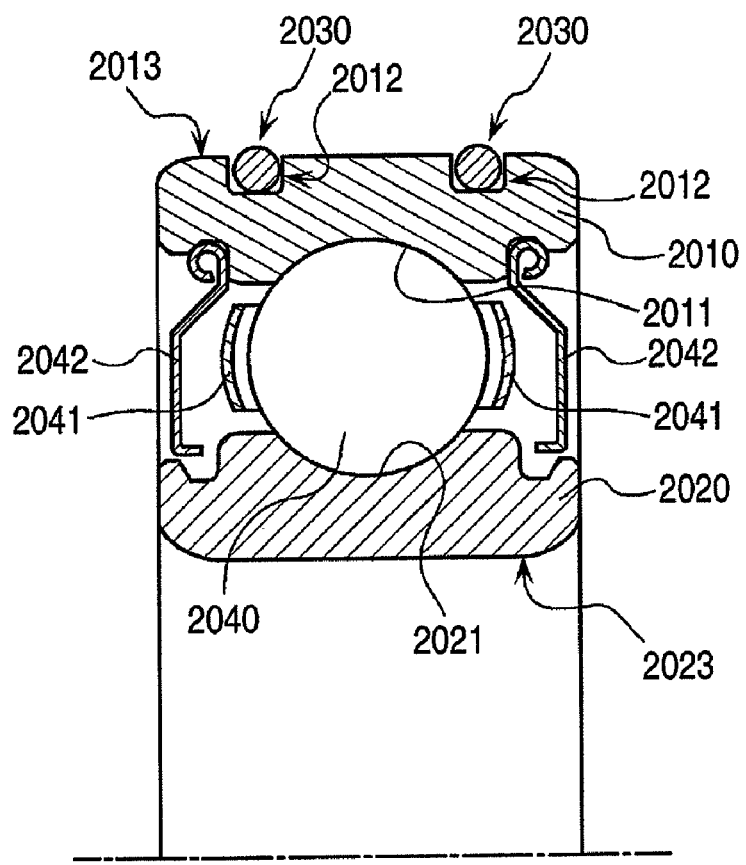
FIG. 11 is a section view of a conventional rolling bearing.

The present embodiment is assumed on such rolling bearing as shown in FIG. 9 which is incorporated into a fan motor and the like, and is characterized in that it can prevent a creep from occurring between a groove formed in an outer ring 2010, that is, a recessed groove 2012 and an O-ring 2030. Here, since the other remaining structures of the rolling bearing than the inner circumferential surface of the recessed groove 2012 are the same as those of the rolling bearing according to the above-mentioned third background art (see FIG. 11), in FIG. 9, the same parts are given the same designations and thus the detailed description thereof is omitted here.

As shown in FIG. 9, according to the present embodiment, in order to prevent the occurrence of a creep, the roughness of the internal surface S of the recessed groove 2012, into which the O-ring 2030 has been fitted, is finished for 0.05 μm Ra (Ra: roughness equal to or higher than the average value of the absolute value difference obtained from the average line of a roughness curve expressing the measured surface roughness) or higher. The reason for this is that: when the roughness is smoother than 0.05 μm Ra, since a load, which causes a creep to occur, (a creep limit load (a creep-resisting force)) is reduced, a creep occurs in an early stage.

Here, in this case, the surface finish roughness of the internal surface S of the recessed groove 2012 is set rougher than the roughness of the fitting surface of the motor housing. However, when the size of the roughness is excessively large, there is a possibility that it can have an ill influence on the accuracy of the dimensions of the composing members of the rolling bearing. In view of this, the roughness of the internal surface S of the recessed groove 2012 may preferably be set 1 μm Ra or less.

In this case, the projection amount L of the O-ring 2030 from the outer circumferential surface 2013 of the outer ring 2010 may preferably be set in the range of 0.15 mm~0.4 mm. More preferably, the ratio of the projection amount L to the O-ring wire diameter d [L/d] may be set in the range of 15%~20%.

The above set projection amount increases a friction force between the O-ring 2030 and the internal surface S of the recessed groove 2012. This can prevent a creep from occurring between the O-ring 2030 and the internal surface S of the recessed groove 2012, thereby being able to secure a sufficient creep-resisting property. Further, since the surface roughness of the fitting surface of the motor housing is set relatively smooth, it is easy to incorporate the rolling bearing into the motor housing of the fan motor.

Figure 10:
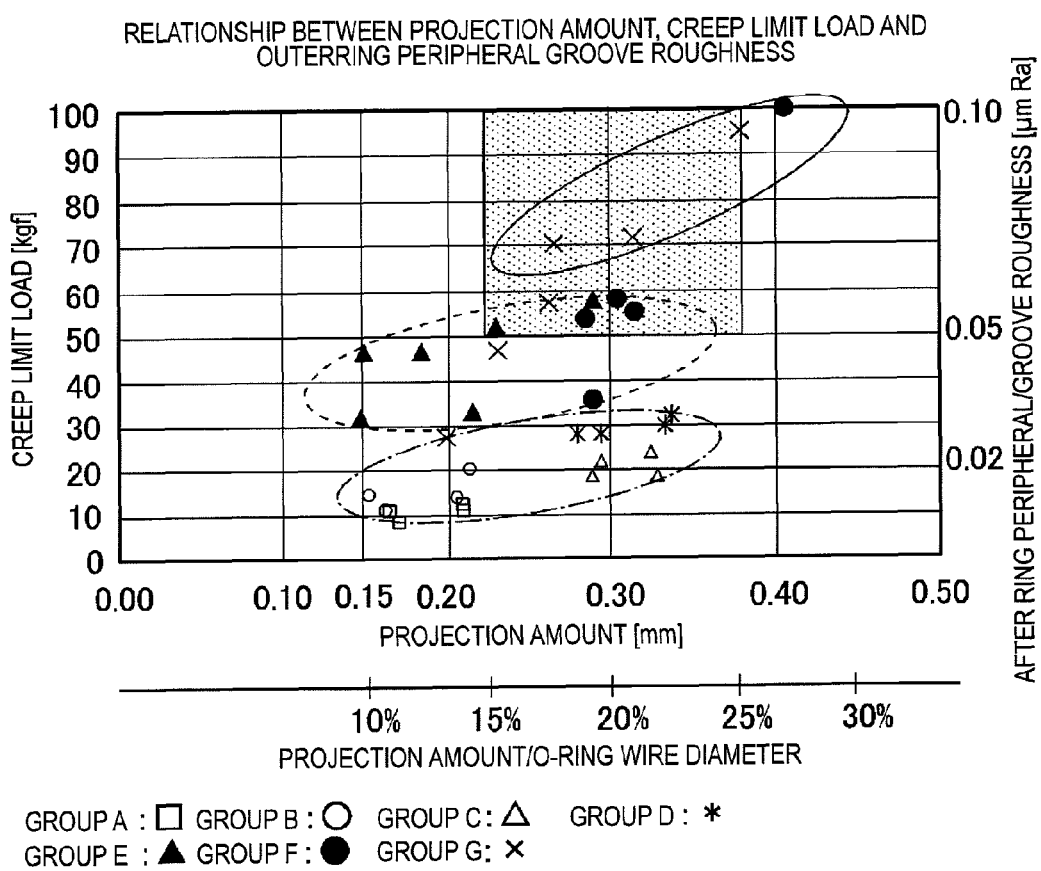
FIG. 10 is a graph of the relationship between the surface roughness of the internal surface of the recessed groove of an outer ring, the projection amount of an O-ring and a creep limit load (a creep-resisting force)

Next, the relationships between the surface roughness of the internal surface S of the outer ring recessed groove 2012, the projection amount L of the O-ring 2030 from the recessed groove 2012 and the creep limit load (the creep-resisting force) were examined, and the examined results were graphically represented (see FIG. 10).

In the present examination, the creep limit loads (the creep-resisting forces) of multiple samples, which are different in the outer ring recessed groove roughness and the O-ring projection amount from each other, were examined and plotted. The results are as follows: that is, in an A group (see a sign shown in the graph), the outer ring recessed groove roughness was set approximately in the range of 0.009 μm Ra~0.013 μm Ra, and the O-ring projection amount was set approximately in the range of 0.16 mm~0.22 mm; and, in this case, the creep limit load (the creep-resisting force) was approximately 9 kgf~13 kgf.

In a B group (see a sign O shown in the graph), the outer ring recessed groove roughness was set approximately in the range of 0.011 μm Ra~0.02 μm Ra, and the O-ring projection amount was set approximately in the range of 0.15 mm~0.23 mm; and, in this case, the creep limit load (the creep-resisting force) was approximately 11 kgf~20 kgf.

In a C group (see a sign ▲ shown in the graph), the outer ring recessed groove roughness was set approximately in the range of 0.018 μm Ra~0.024 μm Ra, and the O-ring projection amount was set approximately in the range of 0.29 mm~0.33 mm; and, in this case, the creep limit load (the creep-resisting force) was approximately 18 kgf~24 kgf.

In a D group (see a sign * shown in the graph), the outer ring recessed groove roughness was set approximately in the range of 0.028 μm~Ra 0.032 μm Ra, and the O-ring projection amount was set approximately in the range of 0.28 mm~0.34 mm; and, in this case, the creep limit load (the creep-resisting force) was approximately 28 kgf~32 kgf.

In an E group (see a sign ▲ shown in the graph), the outer ring recessed groove roughness was set approximately in the range of 0.031 μm~Ra 0.058 μm Ra, and the O-ring projection amount was set approximately in the range of 0.15 mm~0.29 mm; and, in this case, the creep limit load (the creep-resisting force) was approximately 31 kgf~58 kgf.

In an F group (see a sign • shown in the graph), the outer ring recessed groove roughness was set approximately in the range of 0.035 μm Ra~0.10 μm Ra, and the O-ring projection amount was set approximately in the range of 0.27 mm~0.41 mm; and, in this case, the creep limit load (the creep-resisting force) was approximately 35 kgf~100 kgf.

In a G group (see a sign x shown in the graph), the outer ring recessed groove roughness was set approximately in the range of 0.028 μm Ra~0.095 μm Ra, and the O-ring projection amount was set approximately in the range of 0.20 mm~0.38 mm; and, in this case, the creep limit load (the creep-resisting force) was approximately 46 kgf~95 kgf.

The above results show that, when the outer ring recessed groove roughness is set equal to or larger than 0.05 μm Ra, there can be provided a good creep limit load (a creep-resisting force).

Further, the results show that, when the outer ring recessed groove roughness is set equal to or larger than 0.05 μm Ra and the O-ring projection amount is set in the range of 0.15 mm~0.4 mm, there can be provided a good creep limit load (a creep-resisting force).

Still further, the results show that, when the O-ring wire diameter is 0.15 mm and the rate of the O-ring projection amount to this O-ring wire diameter is set in the range of 15%~20%, there can be provided a better creep limit load (a creep-resisting force) (see the half-tone dot meshed range in the graph).

Here, in the present embodiment, there has been illustrated an example in which the O-ring 2030 is fitted into the outer circumferential surface 2013 of the outer ring 2010. However, instead of this or in addition to this, within the scope of the invention, the inner circumferential surface 2023 of the inner ring 2020 (see FIG. 11) may include a recessed groove 2012, and the O-ring 2030 may be mounted onto the recessed groove 2012, so that the surface roughness of the internal surface of the recessed groove 2012 may be set rougher than the surface roughness of the fitting surface of the rotation shaft as well as in the above-mentioned roughness range, thereby being able to enhance the creep limit property of the inner ring side. Also, the present embodiment is assumed on the outer ring rotation structure that the outer ring 2010 can be rotated. However, the invention is not limited to this but the invention can also be applied even to an inner ring rotation structure that the inner ring 2020 can be rotated.

Fourth Embodiment

Now, description will be given below of a fourth embodiment of the invention with reference to the accompanying drawings.

Figure 16:
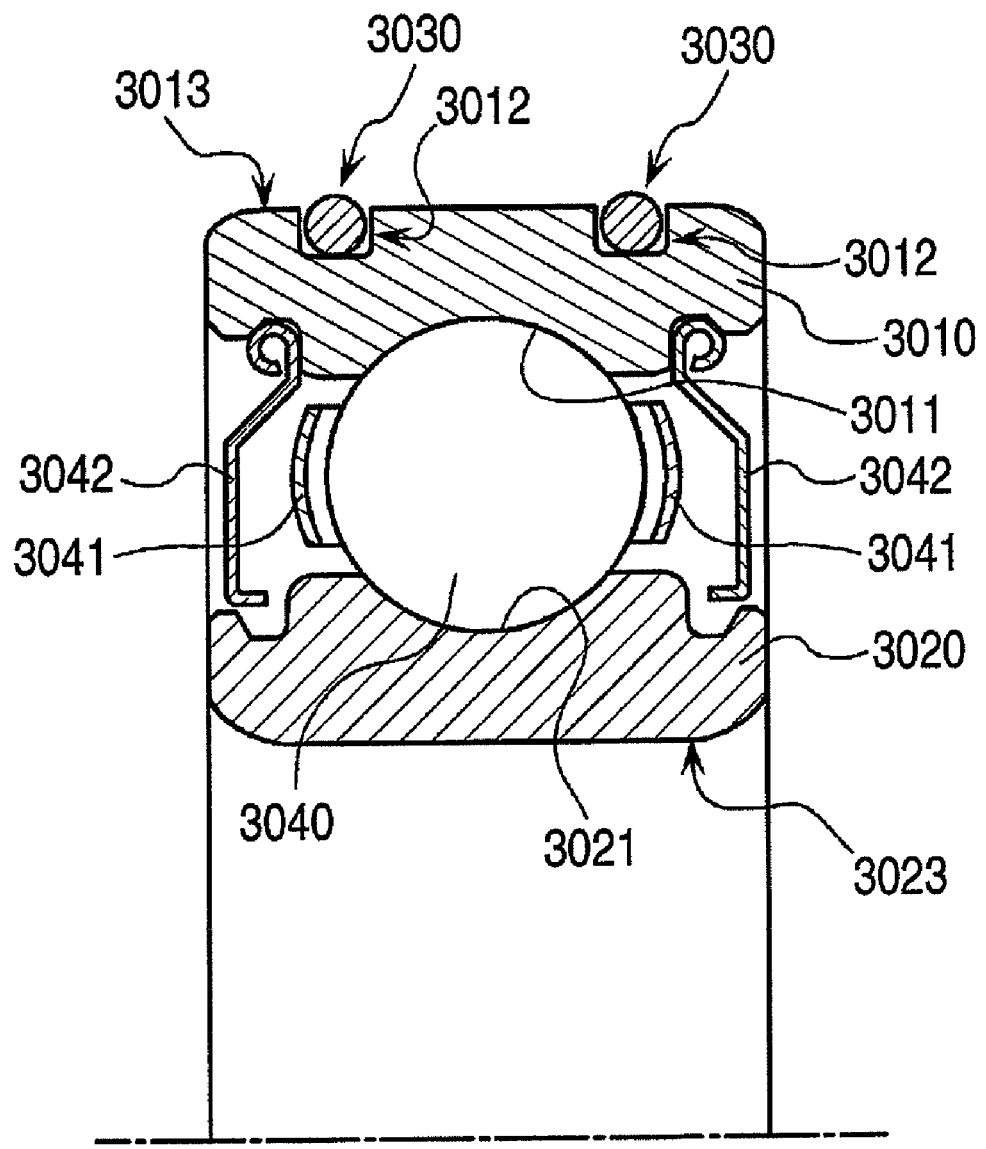
FIG. 16 is a section view of a conventional rolling bearing.

The present embodiment is an improved version of the rolling bearing shown in FIG. 16. Thus, description will be given below only of the improved portions of the rolling bearing. Here, the composing parts of the present embodiment having the same structures as the bearing structures of the fourth background art (FIG. 16) are given the same designations and the detailed description thereof is omitted here.

Figure 12:
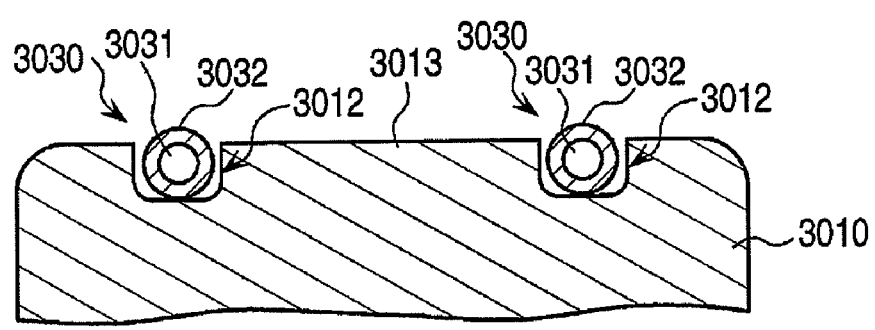
FIG. 12 is a partially enlarged view of the outer diameter side of an outer ring according to a fourth embodiment of the invention.

As shown in FIG. 12, according to the present embodiment, an O-ring 3030 extending continuously in the circumferential direction thereof is fitted into a recessed groove 3012 formed in the outer circumferential surface 3013 of an outer ring 3010. The projection amount of the O-ring 3030 from the outer circumferential surface 3013 of an outer ring 3010 is set smaller than such projection amount that, when the rolling bearing is inserted into a motor housing, allows the rolling bearing to provide a desired friction force for prevention of the occurrence of a creep.

Further, in the inside of the O-ring 3030, the elastic member includes a single gap 3031 which is airtight isolated from the outside and extends continuously in the circumferential direction of the elastic member.

According to this structure, when the rolling bearing is inserted into the motor housing, since the projection of the O-ring 3030 is set small, a friction force between the rolling bearing and the inner circumferential surface (fitting surface) of the motor housing becomes relatively small, which can reduce the resistance of the rolling bearing when it is inserted into the motor housing.

When the motor is driven after the rolling bearing is inserted into the motor housing, due to the raised temperature resulting from the driven motor, the air of the gap 3031 formed inside the O-ring 3030 and airtight isolated from the outside is heated and expanded. In this case, the expanded air acts in a direction to spread out the O-ring 3030 outwardly from inside (that is, a direction to spread the wire diameter of the O-ring 3030), which increases the projection amount of the O-ring 3030. Therefore, the outer diameter side 3032 (the largest diameter portion) of the O-ring 3030 is pressed against the fitting surface of the motor housing that is opposed to the outer diameter side 3032, thereby increasing a friction force between the outer diameter side 3032 and the fitting surface of the motor housing. And, when the O-ring 3030 projects from the outer circumferential surface 3013 of the outer ring 3010 by an amount equal to or more than the projection amount that allows the rolling bearing to provide a desired friction force for prevention of the occurrence of a creep, there can be obtained such friction force that can prevent the occurrence of the creep sufficiently. In this manner, the creep-resisting property of the rolling bearing can be maintained constant.

Here, in the structure of the O-ring 3030 according to the present embodiment, the more the capacity of the gap 3031 is, the more the expansion amount of the air with respect to the temperature increase amount is; and, therefore, the projection amount of the O-ring 3030 and the capacity of the gap 3031 have a close relationship between them. Accordingly, the capacity of the gap 3031 may be set according to the using environments or needs of the rolling bearing. Here, since the capacity of the gap 3031 can be set freely according to the design change of the thickness and number of the gaps 3031, a method for setting the capacity is not limited to a specific method here.

Figure 13:
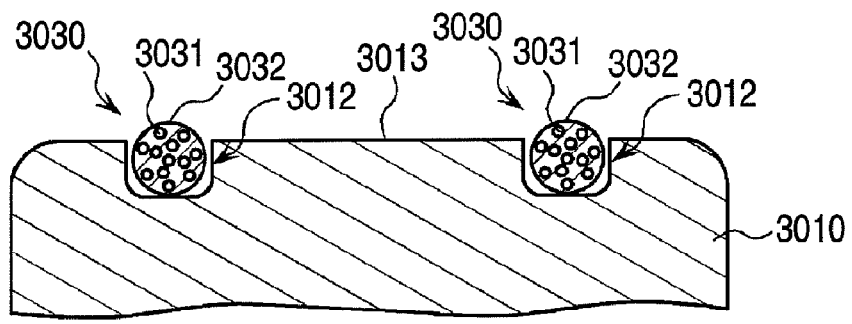
FIG. 13 is a partially enlarged view of the outer diameter side of an outer ring according to a first modification of the fourth embodiment of the invention.

Also, the present invention is not limited to the above-mentioned embodiment but, even when the invention is structured in the following manner, there can be provided similar effects to the above-mentioned effects. As a modification thereof, for example, as shown in FIG. 13, in the inside of the O-ring 3030, as an gap which is airtight isolated from the outside, there may be dotted a large number of fine gaps 3031.

Figure 14:
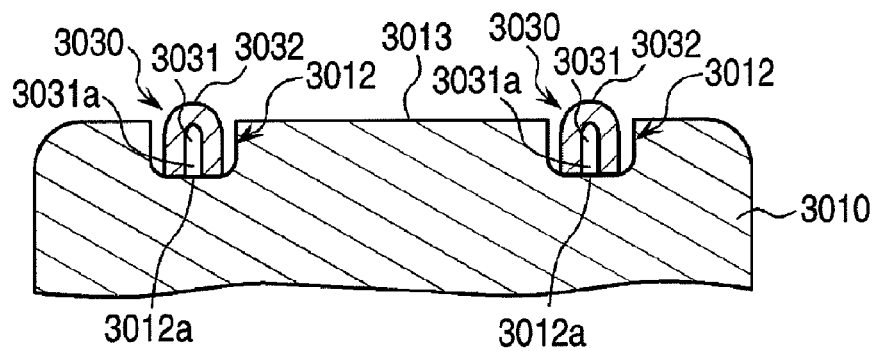
FIG. 14 is a partially enlarged view of the outer diameter side of an outer ring according to a second modification of the fourth embodiment of the invention.

Further, the gap 3031 may not be airtight isolated from the outside in the inside of the O-ring 3030. For example, as shown in FIG. 14, the O-ring 3030 may also be mounted in such a U-shaped manner that the two end portions of a sheet-shaped elastic member are so bent as not to be contacted with each other and these two end portions are closely contacted with the bottom surface 3012a of the recessed groove 3012 of the outer ring 3010. In this case, since, when the O-ring 3030 is mounted, the opening 3031a of the gap 3031 formed between the two end portions is closely contacted with the bottom surface 3012a, the gap 3031 is airtight isolated from the outside.

Figure 15:
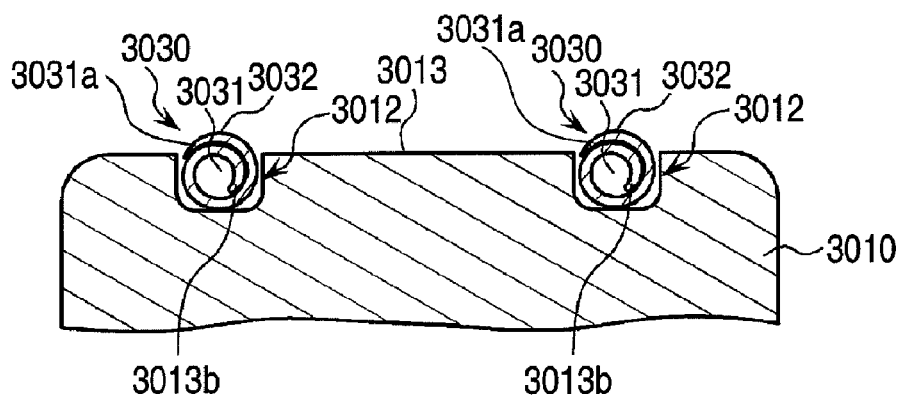
FIG. 15 is a partially enlarged view of the outer diameter side of an outer ring according to a third modification of the fourth embodiment of the invention.

Or, as shown in FIG. 15, one end 3031a of a sheet-shaped elastic member may be contacted with the other end 3031b and thus may be rounded, whereby the two end portions 3031a, 3031b of the elastic member may be closely self-contacted with each other and thus the gap 3031 formed in the central portion of them may be airtight isolated from the outside.

Here, in the present embodiment, description has been given on the assumption that the elastic member is formed to extend continuously in the circumferential direction thereof. However, instead of this, there may also be employed such an elastic member as extends intermittently in the circumferential direction thereof. In this case, the gap 3031 may be structured such that it can be airtight isolated from the outside by closing the circumferential direction two end portions of the elastic member.

Also, in the present embodiment, the material of the elastic member is not limited to a specific one. That is, there can be used any material, provided that a friction force can be produced between the outer circumferential surface 3013 of the outer ring 3010 and the fitting surface of the housing (fixed member) and thus a sufficient creep-resisting property can be maintained. For example, there may also be used rubber or elastic resin.

Further, in the present embodiment, although there has been shown an example in which the O-ring 3030 is fitted with the outer circumferential surface 3013 of the outer ring 3010, instead of this, within the scope of the invention, the inner ring 3020 may include a recessed groove 3012 formed in the inner circumferential surface 3023 thereof (see FIG. 16), and the O-ring 3030 may be mounted onto the recessed groove 3012, whereby a creep-resisting property between the inner diameter surface 3023 of the inner ring 3020 and the fitting surface of the rotation shaft to be fitted therewith can be maintained constant and also the insertion resistance of the rolling bearing into the rotation shaft can be reduced. Also, although the present embodiment is assumed on the outer ring rotation structure that the outer ring 3010 can be rotated, this is not limitative but the invention can also be applied even to an inner ring rotation structure that the inner ring 3020 can be rotated.

Fifth Embodiment

Now, description will be given below of a fifth embodiment according to the invention.

Figure 17:
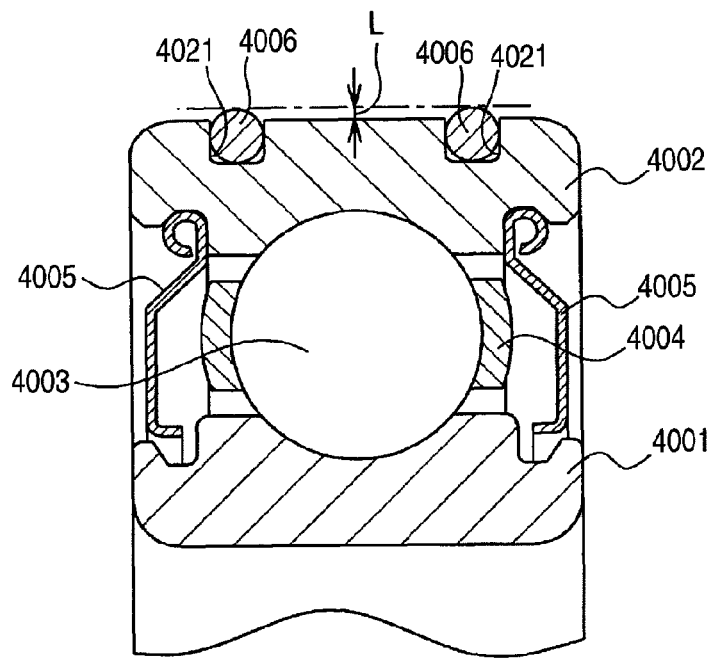
FIG. 17 is a section view of a rolling bearing corresponding to a fifth embodiment of the invention.

FIG. 17 is a section view if a rolling bearing which corresponds to a fifth embodiment according to the invention.

The present rolling bearing includes an inner ring 4001, an outer ring 4002, a ball 4003, a cage 4004, a shield plate 4005, and two O-rings 4006. The two O-rings 4006 are respectively fitted into two peripheral grooves 4021 respectively formed in two lines in the outer circumferential surface of the outer ring 4002. The projection amount L of the O-ring 4006 from the outer circumferential surface of the outer ring 4002 is set in the range of 4~40% of the diameter of the O-ring 4006.

Also, the O-ring 4006 is made of nitrile rubber which has a tensile permanent distortion rate of 3% or less and, after it is immersed in ester-system oil for about 1000 hours, has a dimension change rate of 2% or less.

Figure 18:
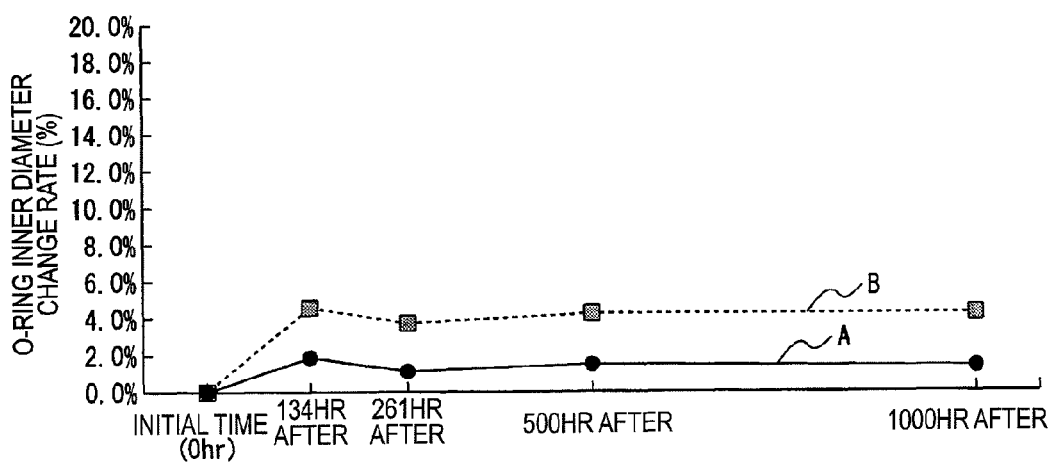
FIG. 18 is a graph of the respective inner diameter change rates of O-rings A and B when ester-system oil is applied to the O-rings A and B and the O-rings are left at the ambient temperature of 70° C. for 134 hours, 261 hours, 500 hours and 1000 hours.
Figure 19:
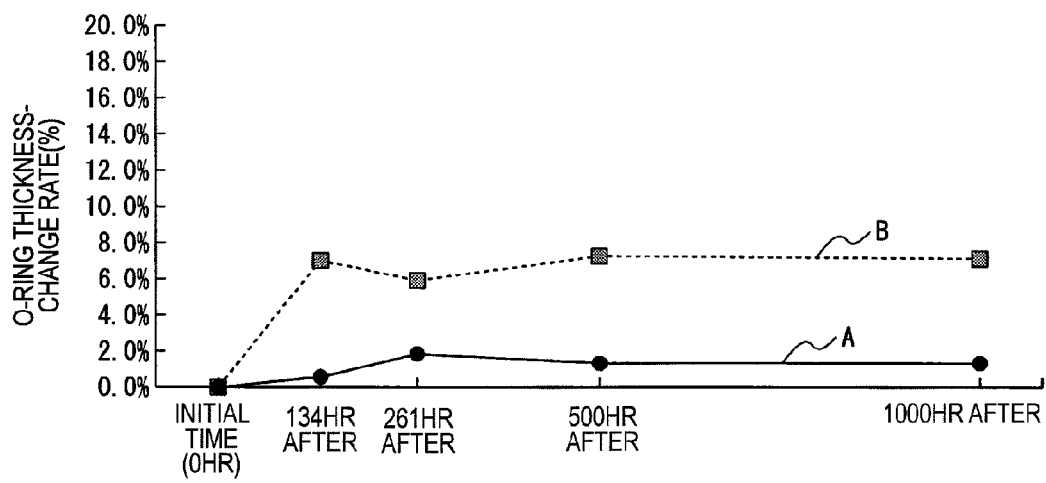
FIG. 19 is a graph of the respective thickness change rates of O-rings A and B when ester-system oil is applied to the O-rings A and B and the O-rings are left alone at the ambient temperature of 70° C. for 134 hours, 261 hours, 500 hours and 1000 hours.

There were prepared an O-ring A made of [JSR N230S] (NBR the acrylonitrile content of which is 35 mass %) manufactured by JSR (Co.) and a conventional O-ring B, ester-system oil was applied to them, and they were left alone for 1000 hours at the ambient temperature of 70° C. And, how much the inner diameter dimensions of the respective O-rings were changed from their initial inner diameter dimensions was examined. FIG. 18 shows the results of this examination. Also, how much the thicknesses of the respective O-rings were changed from their initial thicknesses was examined. FIG. 19 shows the results of this examination.

From these results, it has been found that the dimension change rate of the O-ring A after it was immersed in the ester-system oil for about 1000 hours is 2% or less, whereas that of the O-ring B is 4% or more.

Also, there was used, as a test rolling bearing, a rolling bearing having the structure shown in FIG. 17 in which the inner diameter thereof is 20 mm and the outside diameter thereof is 47 mm; and, there were prepared two such test rolling bearings in one of which the above-mentioned O-ring A was fitted into the two peripheral grooves 4021 and in the other of which the above-mentioned O-ring B was fitted into the two peripheral grooves 4021. Next, grease having ester-system oil as the base oil thereof was applied to the outer circumferential surfaces of the outer rings 4002 of these test rolling bearings, and then they were fitted into the housings respectively. In this state, the respective test bearings were rotated and there was conducted on them a test for examining the aging changes of the creep-resisting forces (N) of the two test bearings.

Figure 20:
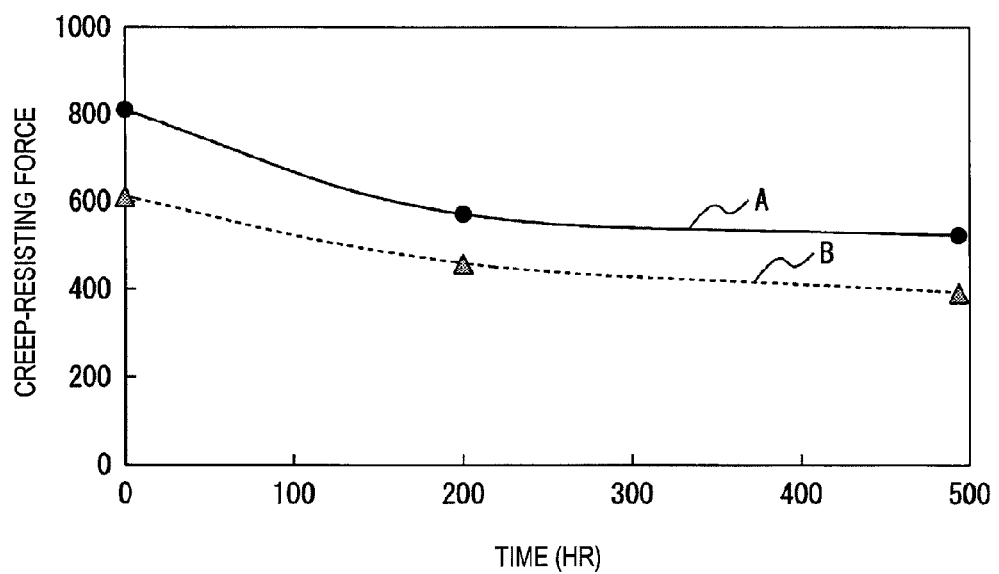
FIG. 20 is a graph of the relationship between a creep-resisting force and a test hour obtained from a test conducted using a rolling bearing A using an O-ring A and a rolling bearing B using an O-ring B.

The test conditions were set such that an imbalance load is 420N and an ambient temperature is 120° C. FIG. 20 is a graph which shows the results of the test. In FIG. 20, a line A shows the results that were obtained when the O-ring A was used, whereas a line B shows the results obtained when the O-ring B was used.

This graph shows that the rolling bearing using the O-ring A corresponding to the fifth embodiment of the invention can maintain a stable creep-resisting force for a long period of time even under the high temperature of 120° C. More preferably, there may be used an O-ring which has a coefficient of line expansion in the range of $2.2 \times 10{-5}/°$ C.~$10 \times 10{-5}/°$ C.

Sixth Embodiment

Now, description will be given below of a sixth embodiment according to the invention with reference to the accompanying drawings. The present invention relates to a rolling bearing to be incorporated into a fan motor or the like. Specifically, the present rolling bearing is characterized by the structure of an O-ring 5030 serving as creep preventing means interposed between the fitting surface of a housing H (e.g., a fan motor housing, see FIG. 23B) and the outer circumferential surface 5013 of an outer ring 5010 and/or between the fitting surface of a rotation shaft S (e.g., a fan motor shaft, see FIG. 21) and the inner circumferential surface 5023 of an inner ring 5020, and also by the structure of a recessed groove 5012 into which the O-ring 5030 is to be stored. Therefore, the basic structure of the rolling bearing except for the O-ring 5030 and recessed groove 5012 can employ the structure of the rolling bearing according to the above-mentioned sixth background art and the structures of other bearings of this type. Thus, description will be given below here mainly of the characteristic structures of the invention, that is, the structure of the O-ring 5030 and the structure of the recessed groove 5012 for storing the O-ring therein; and, the other remaining structures of the present embodiment are given the same designations as the sixth background art and thus the description thereof is omitted here.

Figure 21:
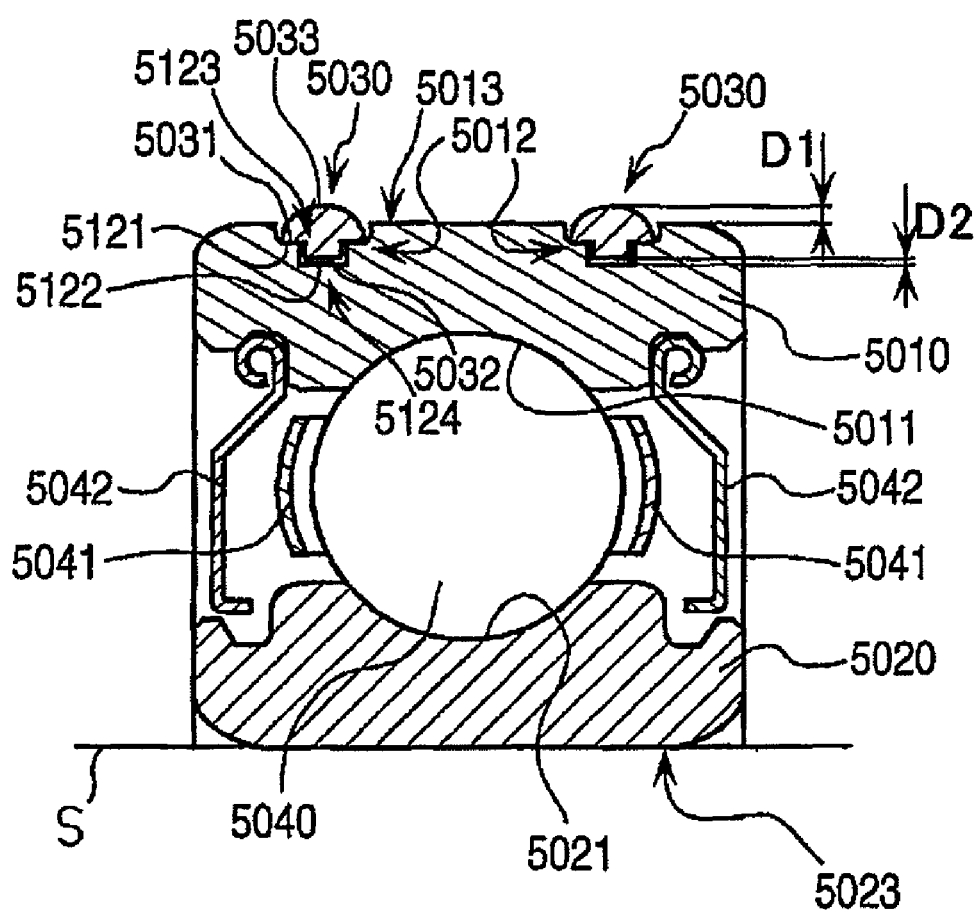
FIG. 21 is a section view of a rolling bearing in the radial direction thereof according to a sixth embodiment of the invention.

FIG. 21 is a section view of a rolling bearing in the radial direction thereof, showing an example in which, in order to prevent a creep from occurring between the fitting surface of the housing and the outer circumferential surface 5013 of the outer ring 5010, as a sixth embodiment of the invention, the O-ring 5030 is fitted into the recessed groove 5012 formed in the outer circumferential surface 5013 of the outer ring 5010.

Figure 22A:
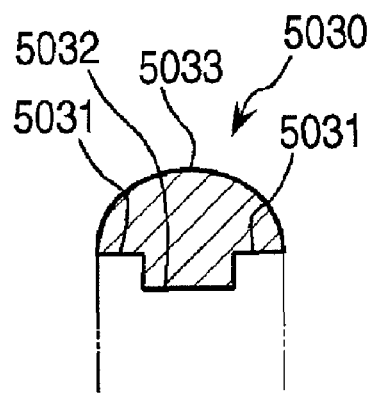
FIG. 22A is an enlarged section view of an O-ring in the radial direction thereof.
Figure 22B:
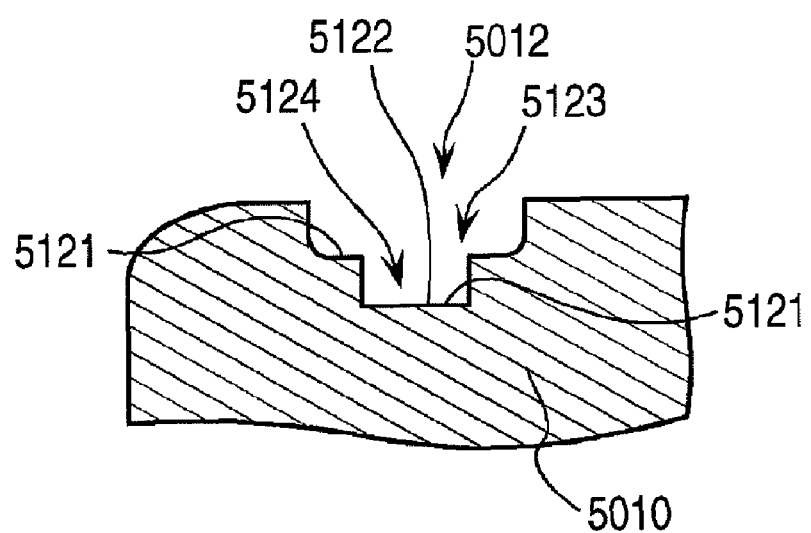
FIG. 22B is an enlarged section view of the neighboring portion of the recessed groove of an outer ring in the radial direction thereof.

The recessed groove (circumferential groove) 5012, as shown in FIG. 22, includes: a first bottom surface 5121 which is formed by digging the outer circumferential surface 5013 of the outer ring 5010 into a given depth and also which extends continuously in the circumferential direction of the surface 5013; and, a second bottom surface 5122 which is formed by digging the axial-direction central portion of the first bottom surface 5121 further deeply and also which extends continuously in the circumferential direction of the surface 5013. That is, the recessed groove 5012 is formed in an inversely projecting shape by a pair of first bottom surfaces 5121 and a second bottom surface 5122 dug in between the two first bottom surfaces 5121 (see FIG. 22B) which form a stepped surface.

The O-ring 5030 to be stored into this recessed groove 5012 is formed in a ring shape which extends continuously in the circumferential direction thereof. Also, the O-ring 5030 is made of elastic material. As the elastic material, for example, in the present embodiment, there can be selected nitrile rubber, acrylic rubber, silicone rubber, or fluorine rubber.

The inner diameter side of the O-ring 5030 includes: two first inner circumferential surfaces (first surfaces) 5031 to be fitted with a peripheral groove area 5123 which is formed by the first bottom surfaces 5121 of the recessed groove 5012; and, a second inner circumferential surface (a second surface) 5032 which is formed by extending the central portions of the two first inner circumferential surfaces 5031 further in the inside radial direction and also which can be fitted with a peripheral groove area 5124 formed by the second bottom surface 5122. That is, the inner diameter side of the O-ring 5030 is formed in an inversely projecting shape by the pair of first inner circumferential surfaces 5031 and the second inner circumferential surface 5032 extended from between the two first inner circumferential surfaces 5031 (see FIG. 22A).

When the O-ring 5030 is stored into the recessed groove 5012 (at the then time, the rolling bearing is not yet fitted into the housing, and the outside diameter 5033 of the O-ring 5030 is not pressed yet in the inside radial direction, either), the outside diameter 5033 (a portion of the O-ring) of the O-ring 5030 projects from the recessed groove 5012 in the outside radial direction by a given amount (that is, an amount equivalent to a dimension D1 from the outer circumferential surface 5013 of the outer ring 5010 to the outside diameter 5033 of the O-ring 5030).

Figure 23A:
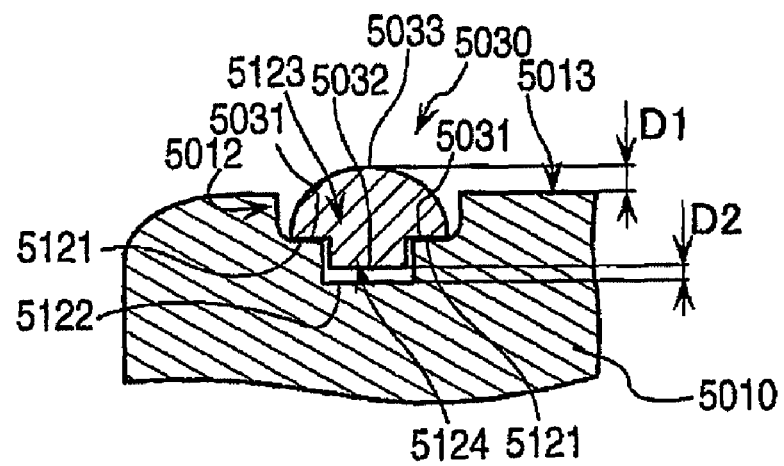
FIG. 23A is an enlarged section view of an O-ring and a recessed groove in the radial direction thereof, showing a state where the O-ring is accommodated into the recessed groove.

Also, the pair of first inner circumferential surfaces 5031 of the O-ring 5030 are respectively contacted with the pair of first bottom surfaces 5121 of the recessed grooves 5012 (see FIGS. 22 and 23A). At the then time, the second inner circumferential surface 5032 of the O-ring 5030 is stored in the peripheral groove area 5124 formed by the second bottom surface 5122 of the recessed groove 5012 and is further situated at a position where it has a clearance D2 with respect to the second bottom surface 5122 (that is, a dimension from the inner diameter (second inner circumferential surface 5032) of the O-ring 5030 to the second bottom surface 5122 of the recessed groove 5012).

The dimension D2 is set smaller than the projection amount of the O-ring 5030 from the recessed groove 5012 (a dimension from the outer circumferential surface 5013 of the outer ring 5010 to the outside diameter 5033 of the O-ring 5030). Here, the dimension D2 and projection amount D1 may preferably have the relationship, $D2 \leqq (D1/2)$ between them and, in the present embodiment, as an example, they are set such that they have the relationship, $D2=((D1)/2)$ between them.

Figure 23B:
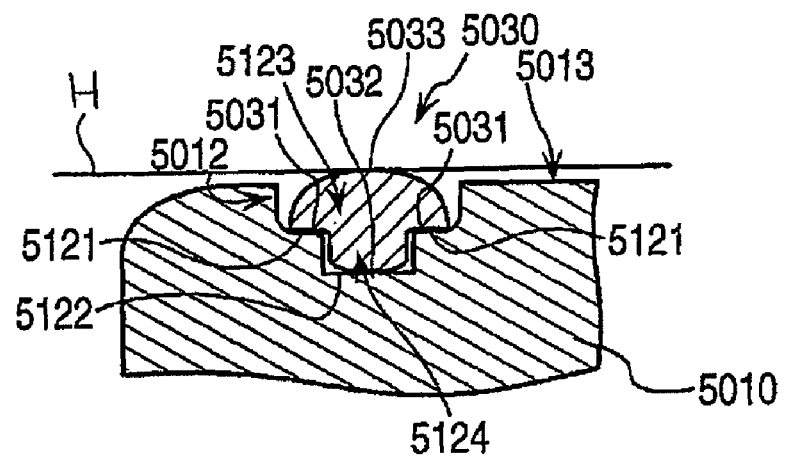
FIG. 23B is an enlarged section view of the O-ring and recessed groove in the radial direction thereof, showing a state where a radial-direction pressing force is further applied to the O-ring.

When a rolling bearing with the O-ring 5030 stored in the recessed groove 5012 is incorporated into the housing H as shown in FIG. 23B, to the O-ring 5030, there is applied a pressing force in the inside radial direction due to the fitting surface of the housing H.

Specifically, when the rolling bearing is incorporated into the housing H, the fitting surface of the housing H and the outside diameter 5033 of the O-ring 5030 are contacted with each other. In this case, since the outer diameter side 5033 of the O-ring 5030 is larger than the fitting surface (not shown) of the housing H, the outer diameter side 5033 is pressed against the fitting surface in the inside radial direction until the outer diameter side 5033 becomes equal to the fitting width of the housing H.

At the then time, in the peripheral groove area 5124 formed by the second bottom surface 5122 of the recessed groove 5012, since the inner diameter side (the second inner circumferential surface 5032) of the O-ring 5030 has the clearance D2 with respect to the second bottom surface 5122 of the recessed groove 5012, owing to the pressing force applied to the outer diameter side 5033 of the O-ring 5030, the second inner circumferential surface 5032 of the O-ring 5030 is deformed elastically. As a result of this, the second inner circumferential surface 5032 is deformed until it is contacted with the second bottom surface 5122 of the recessed groove 5012.

Thus, the projection amount of the O-ring 5030 from the recessed groove 5012 (the dimension from the outer circumferential surface 5013 of the outer ring 5010 to the outer diameter side 5033 of the O-ring 5030) is reduced by a dimension equivalent to the above-mentioned dimension D2; and, at the same time, the reaction force of the O-ring 5030 at the then time becomes smaller than the reaction force thereof when the O-ring 5030 is compressed, because the former reaction force is produced by bending the O-ring 5030.

After the rolling bearing is incorporated into the housing, since the second inner circumferential surface 5032 of the O-ring 5030 is already contacted with the second bottom surface 5122 of the recessed groove 5012, a creep relative rotation torque applied between the fitting surface of the housing and the outer circumferential surface 5013 of the outer ring 5010 acts as a force to compress the O-ring 5030.

In this manner, in the rolling bearing according to the present embodiment, due to the structures of the recessed groove 5012 and O-ring 5030 used therein, up to a dimension which is obtained when the clearance D2 between the inner circumferential surface 5032 and second bottom surface 5122 is subtracted from the projection amount D1 of the O-ring 5030, that is, up to the projection dimension=(D1)/2, the reaction force of the O-ring 5030 provides a relatively weak reaction force produced by the bending force of the O-ring 5030; and, from the projection amount=(D1)/2 to a state where the projection amount exists no longer, the reaction force of the O-ring 5030 provides a relatively strong force produced by the compression force of the O-ring 5030.

Therefore, when incorporating the rolling bearing into the housing, since, as the reaction force of the O-ring 5030, the bending force thereof mainly acts, the bearing insertion force can be reduced and, at the same time, since the second inner circumferential surface 5032 of the O-ring 5030 is fitted into the peripheral groove area 5124 of the recessed groove 5012, the O-ring 5030 is prevented from twisting.

Also, since, after the rolling bearing is incorporated into the housing, as the reaction force of the O-ring 5030, the compression force thereof mainly acts, between the O-ring 5030 and the fitting surface of the housing, there is generated a friction force which overcomes the creep relative rotation torque to thereby enhance a pressing force for fixing the rolling bearing to the housing, which makes it possible to prevent the occurrence of a creep as much as possible.

Figure 24A:
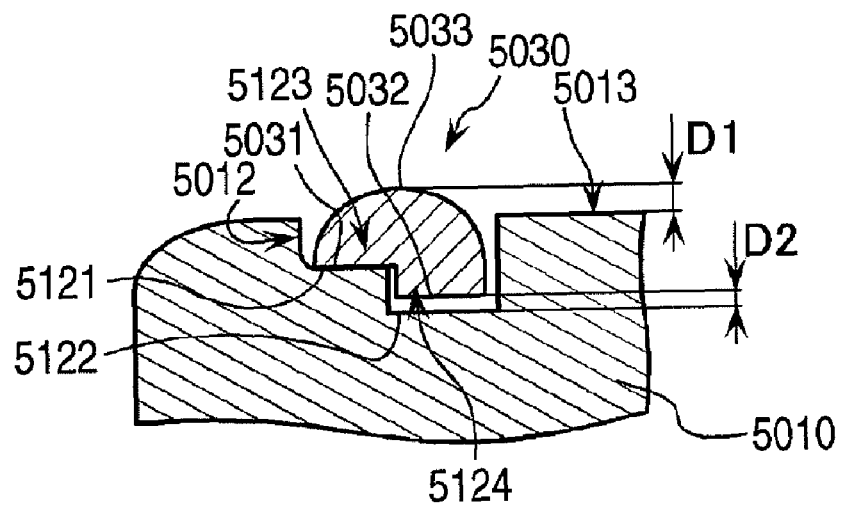
FIG. 24A is an enlarged section view of an O-ring and a recessed groove in the radial-direction thereof according to a first modification of the sixth embodiment of the invention, showing a state where the O-ring is accommodated into the recessed groove.
Figure 24B:
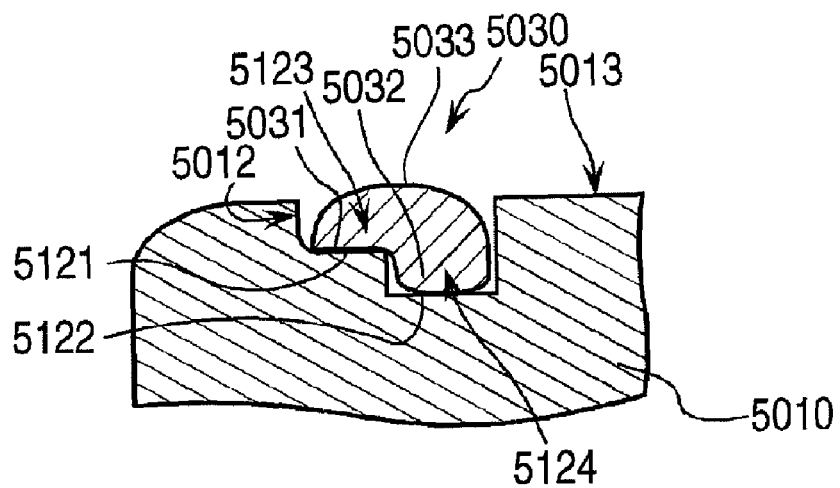
FIG. 24B is an enlarged section view of the O-ring and recessed groove in the radial direction thereof, showing a state where a radial-direction pressing force is further applied to the O-ring.

Also, the invention is not limited to the above-mentioned embodiment, but it can be modified in the following manner. In a first modification shown in FIG. 24, the first bottom surface 5121 of the recessed groove 5012 is formed only one side (in FIG. 24, on the right side) and, correspondingly to the modified shape of the recessed groove 5012, the first inner circumferential surface 5031 of the O-ring 5030 is also formed only one side (in FIG. 24, on the right side).

When storing the O-ring 5030 into the recessed groove 5012, the first inner circumferential surface 5031 of the O-ring 5030 is fitted in until it is contacted with the first bottom surface 5121 of the recessed groove 5012, and the second inner circumferential surface 5032 of the O-ring 5030 is situated at a position where it has the clearance D2 with respect to the second bottom surface 5122.

When the rolling bearing is incorporated into the housing (not shown), the inner diameter side (second inner circumferential surface 5032) of the O-ring 5030 is deformed until it is contacted with the second bottom surface 5122 of the recessed groove 5012. Therefore, when incorporating the rolling bearing into the housing, since the bending force of the O-ring 5030 mainly acts as the reaction force thereof, the O-ring insertion force can be reduced and also, since the second inner circumferential surface 5032 of the O-ring 5030 is fitted in the peripheral groove area 5124 of the recessed groove 5012, the O-ring 5030 can be prevented from twisting.

After the rolling bearing is incorporated into the housing, since the second inner circumferential surface 5032 of the O-ring 5030 is already contacted with the second bottom surface 5122 of the peripheral groove 5012, a creep relative rotation torque applied between the fitting surface of the housing and the outer circumferential surface 5013 of the outer ring 5010 acts as a force to compress the O-ring 5030. Therefore, between the O-ring 5030 and the fitting surface of the housing, there is generated a friction force which overcomes the creep relative rotation torque to thereby enhance a pressing force for fixing the rolling bearing to the housing, which makes it possible to prevent the occurrence of a creep as much as possible.

Here, the remaining structures and operation effects of this modification are similar to those of the above-mentioned embodiment and thus the description thereof is omitted here.

Also, the invention may also be modified further in the following manner.

Figure 25A:
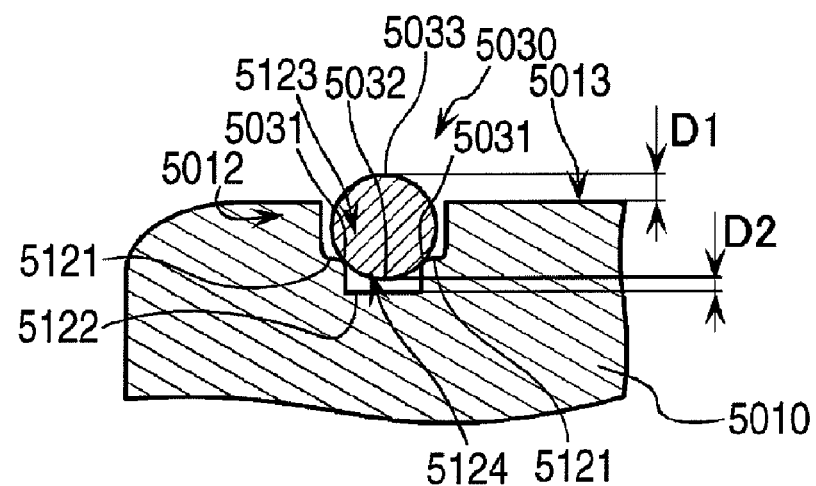
FIG. 25A is an enlarged section view of a second modification of the sixth embodiment of the invention in the radial direction thereof, showing a state where an O-ring is accommodated into a recessed groove.
Figure 25B:
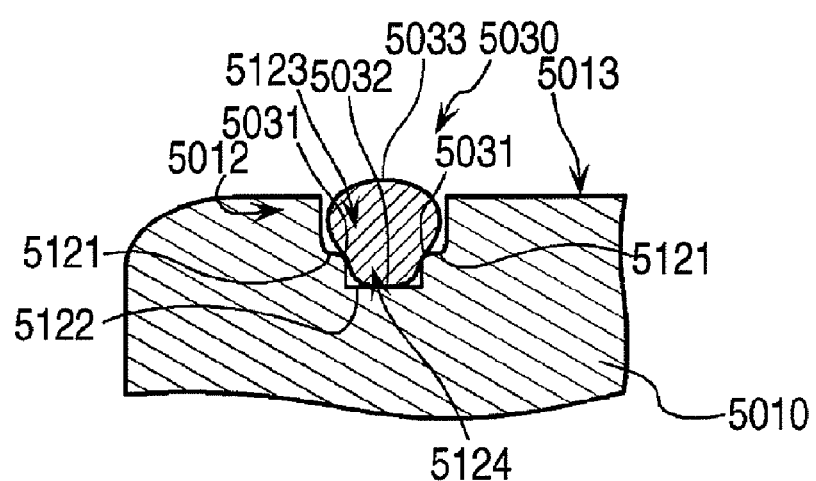
FIG. 25B is an enlarged section view of a third modification of the sixth embodiment of the invention in the radial direction thereof, showing a state where a radial-direction pressing force is further applied to the O-ring.
Figure 26:
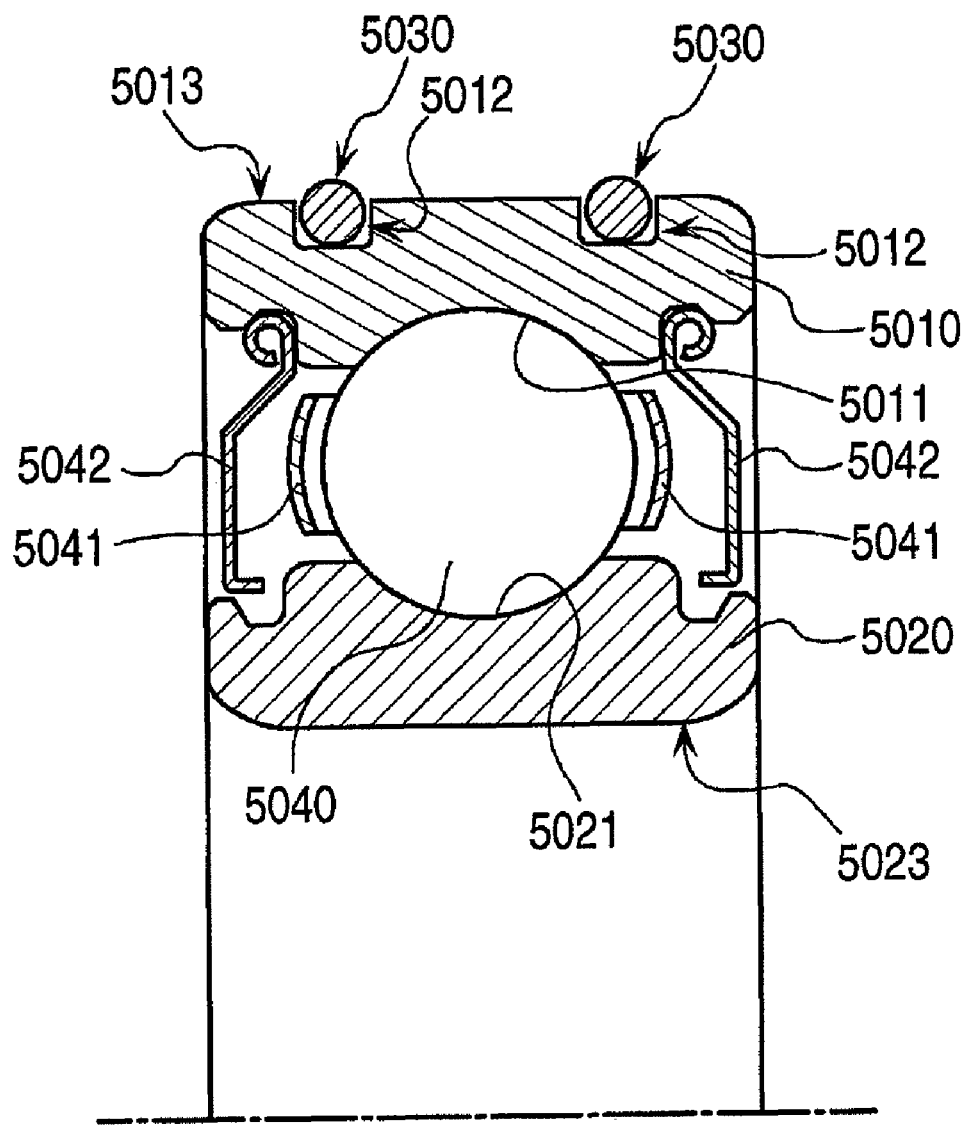
FIG. 26 is a section view of a conventional rolling bearing in the radial direction thereof.

In a second modification of the sixth embodiment shown in FIG. 25, similarly to the above embodiment, in the recessed groove 5012, there are formed a pair of first bottom surfaces 5121 and a second bottom surface 5122 which is dug in between the two first bottom surfaces 5121 and is shorter than the diameter dimension of the O-ring 5030. Also, the O-ring 5030, similarly to the conventional O-ring, has a radial direction section which is circular in shape.

When storing the O-ring 5030 into the recessed groove 5012, the inner diameter side (see reference numerals 5031, 5031 in FIG. 25) of the circular section shape of the O-ring 5030 is fitted in until it is contacted with such corner portions (the portion where the second bottom surface 5122 is dug in) of the paired two first bottom surfaces 5121 of the recessed groove 5012 that are disposed opposed to the portions 5031, 5031); and, the inner diameter portion 5032 of the circular section shape of the O-ring 5030 is situated in the peripheral groove area 5124 formed by the paired second bottom surfaces 5122 at a position where it has the clearance D2 with respect to the second bottom surface 5122.

When the rolling bearing is incorporated into the housing (not shown), the inner circumferential surface 5032 of the O-ring 5030 is deformed until it is contacted with the second bottom surface 5122 of the recessed groove 5012. Therefore, since, when the rolling bearing is incorporated into the housing, as the reaction force of the O-ring 5030, the bending force of the O-ring 5030 mainly acts, the bearing insertion force can be reduced; and also, since the second inner circumferential surface 5032 of the O-ring 5030 is fitted into the peripheral groove area 5124, the O-ring 5030 can be prevented from twisting.

After the rolling bearing is incorporated into the housing, since the second inner circumferential surface 5032 of the O-ring 5030 is already contacted with the second bottom surface 5122 of the recessed groove 5012, a creep relative rotation torque, which acts between the fitting surface of the housing and the outer circumferential surface 5013 of the outer ring 5010, acts as a force which compresses the O-ring 5030. Therefore, between the O-ring 5030 and the fitting surface of the housing, there can be generated a friction force which overcomes the creep relative rotation torque to increase a pressing force which fixes the rolling bearing to the housing, thereby being able to prevent the occurrence of a creep as much as possible.

Here, the remaining structures and operation effects of the present modification are similar to those of the above-mentioned embodiment and thus the description thereof is omitted here.

In the above-mentioned sixth embodiment and the modifications thereof, there has been shown an example of the combination of the shapes of the recessed groove 5012 and O-ring 5030. However, this is not limitative but there can be employed any other shape combination, provided that it is structured in the following manner: that is, the recessed groove 5012 includes a first bottom surface 5121 and a second bottom surface 5122 dug further from the first bottom surface 5121; when the O-ring 5030 is stored, between the inner circumferential surface 5032 of the O-ring 5030 and the second bottom surface 5122 of the recessed groove 5012, there can be formed a clearance having a dimension smaller than the projection amount of the O-ring 5030 from the recessed groove 5012; and, when the rolling bearing is incorporated in the housing, the inner circumferential surface 5032 of the O-ring 5030 can be contacted with the second bottom surface 5122 of the recessed groove 5012.

For example, the O-ring 5030 may include a corner portion or a groove portion on the outer diameter side thereof, or the radial direction section shape of the O-ring 5030 may be a polygonal shape.

Also, as the material of the O-ring 5030, in the above embodiment, there has been illustrated elastic material such as rubber and resin. However, when the characteristic and hardness of the elastic material required according to the installation environment or use of the rolling bearing vary, it is possible to select such material that can satisfy the requirement. Thus, the material of the O-ring 5030 is not limited to any specific one here.

Here, as regards the number of recessed grooves 5012 and the arranging intervals thereof, in the present embodiment, as an example, there has been illustrated a structure in which the two recessed grooves 5012 are formed such that they are spaced from each other in the axial direction. However, the number of recessed grooves 5012 can be increased or decreased according to the installation environment or use of the rolling bearing.

Further, according to the present embodiment, there has been illustrated a structure in which the O-ring 5030 is fitted into the outer circumferential surface 5013 of the outer ring 5010. However, instead of this, without departing from the scope of the invention, it is also possible to employ a structure in which, in the fitting surface of the housing, there is formed a recessed groove 5012 extending continuously in the circumferential direction, and the O-ring 5030 is fitted into this recessed groove 5012. Also, within the scope of the invention, the O-ring 5030 may also be provided on the inner circumferential surface 5023 of the inner ring 5020 or on the rotation shaft side.

Also, in a structure where no recessed groove 5012 is formed, for example, the O-ring 5030 may also be fitted directly with the outer circumferential surface 5013 of the outer ring 5010.

As the material of the elastic member that can be used as the O-ring or the like according to the respective embodiments of the invention, there are available various kinds of synthetic resin, natural resin, synthetic rubber, natural rubber and the like. Preferably, there may be used synthetic rubber; and, as the synthetic rubber, there can be used ACM, AEM, ANM, CM, CSM, EPDM, EPM, EVM, FEPM, FFKM, FKM, IM, NBM, SEBM, SEPM, CO, ECO, GCO, GECO, GPO, ABR, BR, CR, ENR, HNBR, IIR, IR, MSBR, NBIR, NBR, NIR, NR, NOR, PBR, PS, BR, SBR, E-SBR, S-SBR, SIBR, XBR, XCR, XNBR, XSBR, BIIR, CIIR, FMQ, FVMQ, MQ, PMQ, PV, MQ, VMQ, AFMU, AU, EU, OT, EOT, FZ, PZ and the like which are provided in JIS, K6497. These can be used singly, or can be used in a state where they are mixed with each other, or they can be used together with various kinds of additives, various kinds of fillers or the like.

Among these pieces of synthetic rubber, preferably, there may be used NBR (acrylonitrile butadiene rubber), HNBR (hydrogenated acrylonitrile butadiene rubber), and XNBR (carboxylated acrylonitrile butadiene rubber). More preferably, there may be used NBR, specifically, nitrile rubber the acrylonitrile content of which is in the range of 15 mass % or more ~48 mass % or less. Still more preferably, there may be used NBR, nitrile rubber the acrylonitrile content of which is in the range of 25 mass % or more ~41 mass % or less. Most preferably, NBR, nitrile rubber the acrylonitrile content of which is in the range of 34 mass % or more ~36 mass % or less.

The invention has been described hereinbefore in detail or with reference to the specific embodiments thereof. However, it is obvious to persons skilled in the art that there are also possible various changes and modifications without departing from the spirit and scope of the invention.

The present application is based on: Japanese Patent Application (No. 2006-068672) filed on Mar. 14, 2006; Japanese Patent Application (No. 2006-185707) filed on Jul. 5, 2006; Japanese Patent Application (No. 2007-003591) filed on Jan. 11, 2007; Japanese Patent Application (No. 2007-003592) filed on Jan. 11, 2007; Japanese Patent Application (No. 2007-164300) filed on Jun. 21, 2007; and, Japanese Patent Application (No. 2007-235496) filed on Sep. 11, 2007. Thus, the contents of these applications are incorporated herein for reference.

INDUSTRIAL APPLICABILITY

According to the invention, it is possible to provide a rolling bearing which, while preventing the occurrence of a creep as much as possible, can reduce a creep torque when a creep occurs.

And, according to the invention, there is provided a structure in which an O-ring firmly fastens the bottom surface of the recessed groove of the outer circumferential surface of an outer ring. Owing to this structure, even when an imbalance rotation load happens to act on the rolling bearing, a creep is hard to occur between the O-ring and the recessed groove of the outer circumferential surface of the outer ring, thereby being able to maintain a stable creep-resisting property.

Also, according to the invention, owing to employment of a structure capable of preventing a creep from occurring between an O-ring and a groove onto which the O-ring is mounted, there can be provided a rolling bearing which can provide a stable creep-resisting effect for a long period of time.

According to the invention, it is possible to provide a rolling bearing which not only can maintain a creep-resisting property constant but also, when inserting the rolling bearing into between a fixed member and a rotation member, can facilitate the insertion operation thereof.

Further, according to a rolling bearing of the invention, since an O-ring fitted into a peripheral groove formed in the outer circumferential surface of an outer ring is made of nitrile rubber the tensile permanent distortion rate of which is 3% or less and the dimension change rate of which, after it is immersed in ester-system oil for 1000 hours or so, is 2% or less, even when the rolling bearing is used in a state where a lubricant containing ester-system oil is applied to the O-ring, it is possible to prevent a creep from occurring between a housing and the outer ring for a long period of time.

Moreover, according to the invention, it is possible to provide a rolling bearing which, when incorporating it into a housing, can reduce the insertion force thereof, can prevent an O-ring from twisting and, after it is inserted into the housing, can reduce the occurrence of a creep due to a sufficient pressing force for fixing the rolling bearing to the housing.

The invention claimed is:

1. A rolling bearing, comprising:
    an outer ring and an inner ring disposed rotatable relative to each other;
    a plurality of rolling elements incorporated rollably between the outer ring and the inner ring;
    a housing into which the outer ring fits by insertion of the roller bearing into the housing in an axial direction of the roller bearing;
    a shaft on which the inner ring fits;
    a recessed groove formed in one or both of an outer circumferential surface of the outer ring and an inner circumferential surface of the inner ring so as to extend continuously in a circumferential direction thereof; and
    an O-ring made of an elastic member and accommodated in the recessed groove,
    wherein the rolling bearing supports rotation between the shaft and housing,
    the recessed groove includes a first bottom surface having a given depth and a second bottom surface having a larger depth than the first bottom surface,
    the O-ring comprises a projecting portion having a rounded surface in the axial direction of the roller bearing and projected from the recessed groove, and a stepped surface provided on a side opposite to the projecting portion, the stepped surface comprising a first surface fitted with the first bottom surface of the recessed groove, and a second surface disposed between the first bottom surface and the second bottom surface of the recessed groove with respect to a radial direction of the rolling bearing,
    wherein,
        when the projecting portion of the O-ring is not pressed, the second surface is disposed between the first bottom surface and the second bottom surface of the recessed groove with respect to the radial direction of the rolling bearing such that a clearance is formed between the second surface of the O-ring and the second bottom surface, and a dimension of the clearance is smaller than a projection amount of the projecting portion, and
        when the projecting portion is pressed, the O-ring elastically deforms such that the second surface of the O-ring contacts the second bottom surface.

2. The rolling bearing as set forth in claim 1, wherein the rolling bearing is used in a fan motor.

3. The fan motor comprising the rolling bearing as set forth in claim 2,
    wherein the housing is a fan motor housing and the shaft is a fan motor shaft so as to support rotation between the fan motor shaft and the fan motor housing.

4. The rolling bearing as set forth in claim 1, wherein the first bottom surface is provided only on one side of the second bottom surface, and the first surface is provided only on one side of the second surface.

5. The rolling bearing as set forth in claim 1, wherein the first bottom surface is provided on each side of the second bottom surface, and the first surface is provided on each side of the second surface.

6. The rolling bearing as set forth in claim 1, wherein the dimension of the clearance is equal to or smaller than a half of the projection amount of the projecting portion.

7. A rolling bearing comprising:
    an outer ring and an inner ring disposed rotatable relative to each other;
    a plurality of rolling elements incorporated rollably between the outer ring and the inner ring; and
    an O-ring made of an elastic member,
    wherein a recessed groove formed in one or both of an outer circumferential surface of the outer ring and an inner circumferential surface of the inner ring so as to extend continuously in a circumferential direction thereof,
    the O-ring is accommodated in the recessed groove,
    the recessed groove includes a first bottom surface having a given depth and a second bottom surface having a larger depth than the first bottom surface,
    the O-ring comprises a projecting portion having a rounded surface in an axial direction of the roller bearing and projected from the recessed groove, and a stepped surface provided on a side opposite to the projecting portion, the stepped surface comprising a first surface fitted with the first bottom surface of the recessed groove, and a second surface disposed between the first bottom surface and the second bottom surface of the recessed groove with respect to a radial direction of the rolling bearing,
    wherein,
        when the projecting portion of the O-ring is not pressed, the second surface is disposed between the first bottom surface and the second bottom surface of the recessed groove with respect to the radial direction of the rolling bearing such that a clearance is formed between the second surface of the O-ring and the second bottom surface, and a dimension of the clearance is smaller than a projection amount of the projecting portion, and
        when the projecting portion is pressed upon insertion of the roller bearing into a housing in the axial direction of the roller bearing, the O-ring elastically deforms such that the second surface of the O-ring contacts the second bottom surface.

* * * * *